(12) United States Patent
Kanatzidis et al.

(10) Patent No.: US 12,441,834 B2
(45) Date of Patent: Oct. 14, 2025

(54) THIOANION-FUNCTIONALIZED POLYPYRROLES FOR METAL ION CAPTURE

(71) Applicant: Northwestern University, Evanston, IL (US)

(72) Inventors: Mercouri G. Kanatzidis, Wilmette, IL (US); Shulan Ma, Beijing (CN)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 18/738,620

(22) Filed: Jun. 10, 2024

(65) Prior Publication Data
US 2024/0400754 A1 Dec. 5, 2024

Related U.S. Application Data

(62) Division of application No. 16/771,365, filed as application No. PCT/US2018/065614 on Dec. 14, 2018, now abandoned.

(60) Provisional application No. 62/599,316, filed on Dec. 15, 2017.

(51) Int. Cl.
*C08G 61/12* (2006.01)
*B01J 20/26* (2006.01)
*C02F 1/28* (2023.01)
*C02F 101/20* (2006.01)

(52) U.S. Cl.
CPC .......... *C08G 61/124* (2013.01); *B01J 20/262* (2013.01); *C02F 1/28* (2013.01); *C02F 2101/20* (2013.01); *C08G 2261/1644* (2013.01); *C08G 2261/72* (2013.01)

(58) Field of Classification Search
CPC ................................ C08F 26/06; C08G 20/26
See application file for complete search history.

(56) References Cited

U.S. PATENT DOCUMENTS

2005/0121390 A1  6/2005 Wallace et al.

OTHER PUBLICATIONS

Xie et al., "Remarkable Axid Stability of Polypyrrole-MoS4: A Highly Selective and Efficient Scavenger of Heavy Metals Over a Wide pH Range", Advanced Functional Materials, 2018, 281800502. (Year: 2018).*
The Non-Final Office Action issued on Dec. 16, 2024 for U.S. Appl. No. 17/439,309; pp. 1-14.
Y. P. Ting et al., "Recovery of Gold by Electroless Precipitation from Acid Solutions Using Polyaniline," *J. Chem. Tech. Biotechnol.* 1994, 59, 31-36.

* cited by examiner

*Primary Examiner* — Catherine S Branch
(74) *Attorney, Agent, or Firm* — Bell & Manning, LLC

(57) ABSTRACT

Polypyrrole polymers functionalized with thioanions and methods for their use in metal capture applications are provided. Also provided are methods for making the polypyrroles using anion exchange techniques. The thioanion-functionalized polypyrroles have a conjugated, positively charged backbone of pyrrole units that is charge-balanced with associated thioanions.

20 Claims, 14 Drawing Sheets

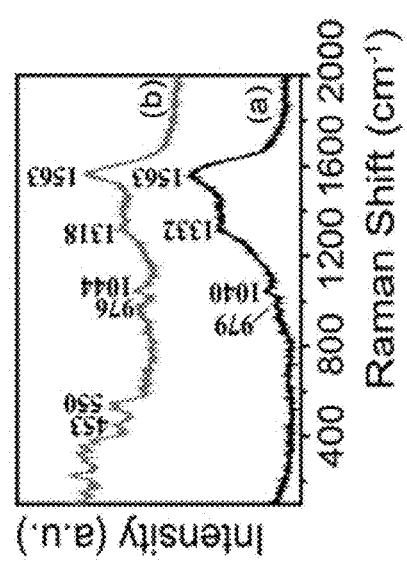
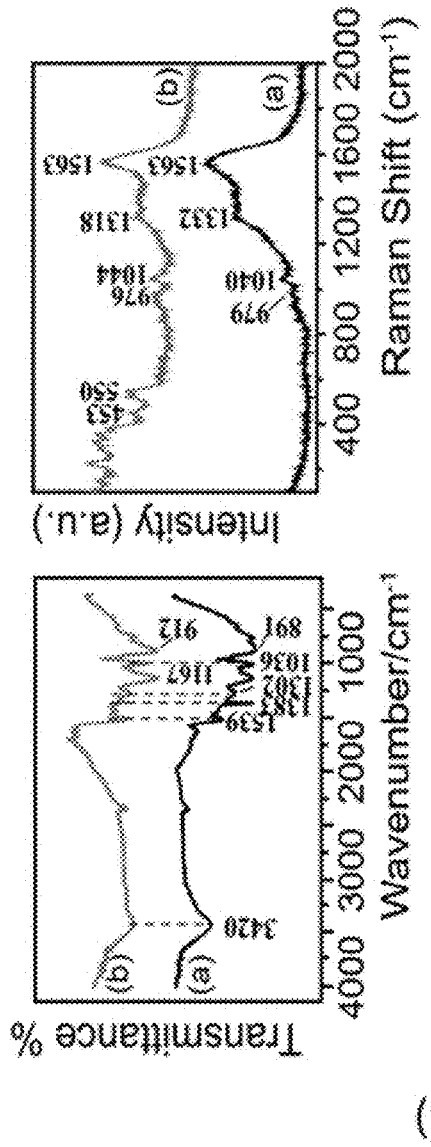
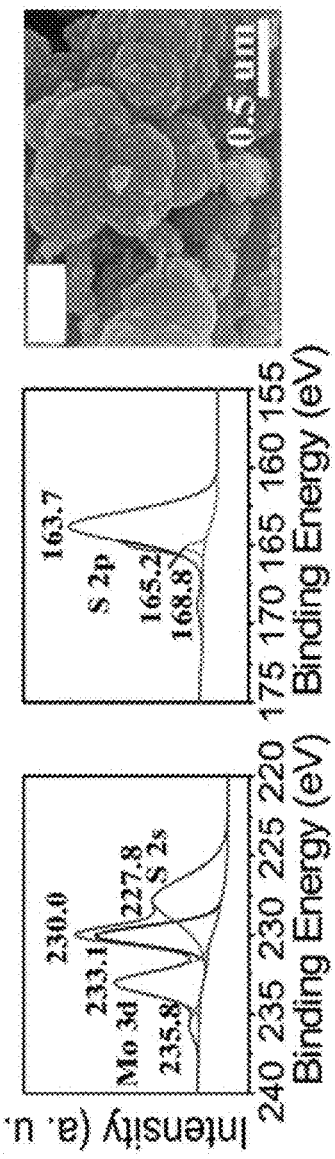
FIG. 1A FIG. 1B FIG. 1C FIG. 1D FIG. 1E

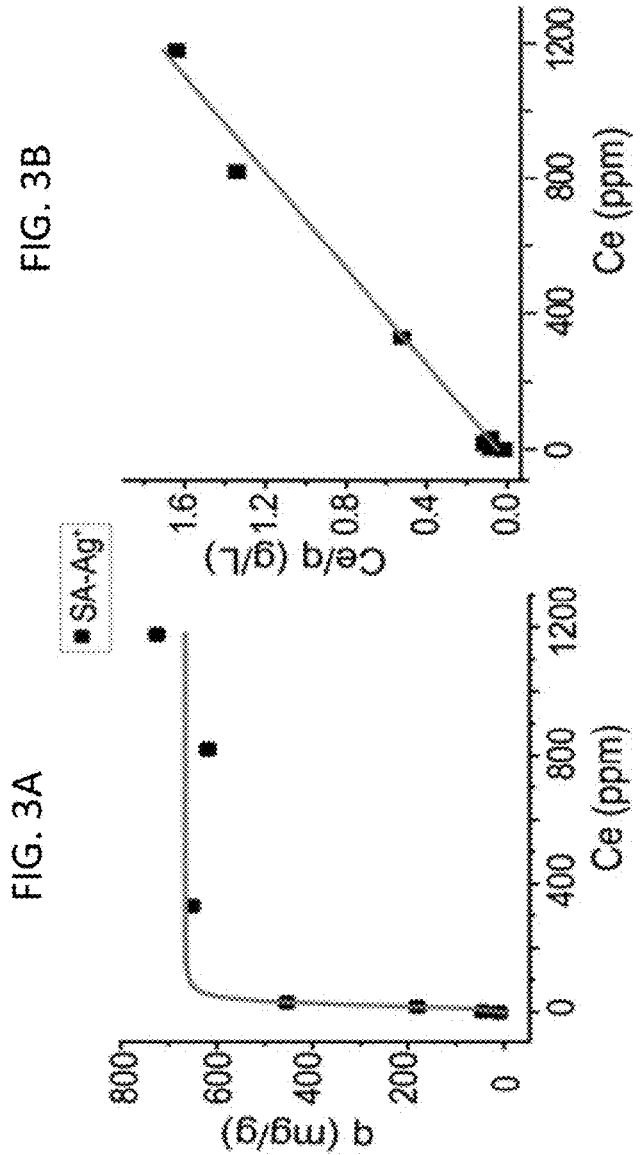

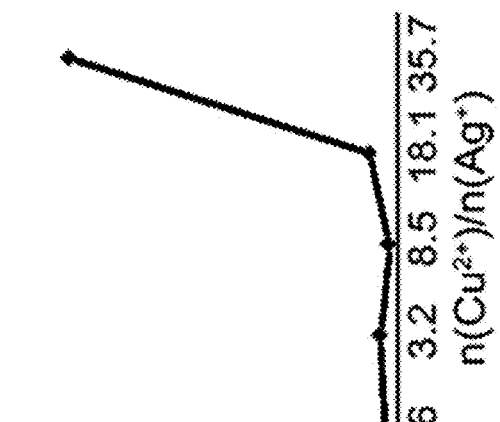
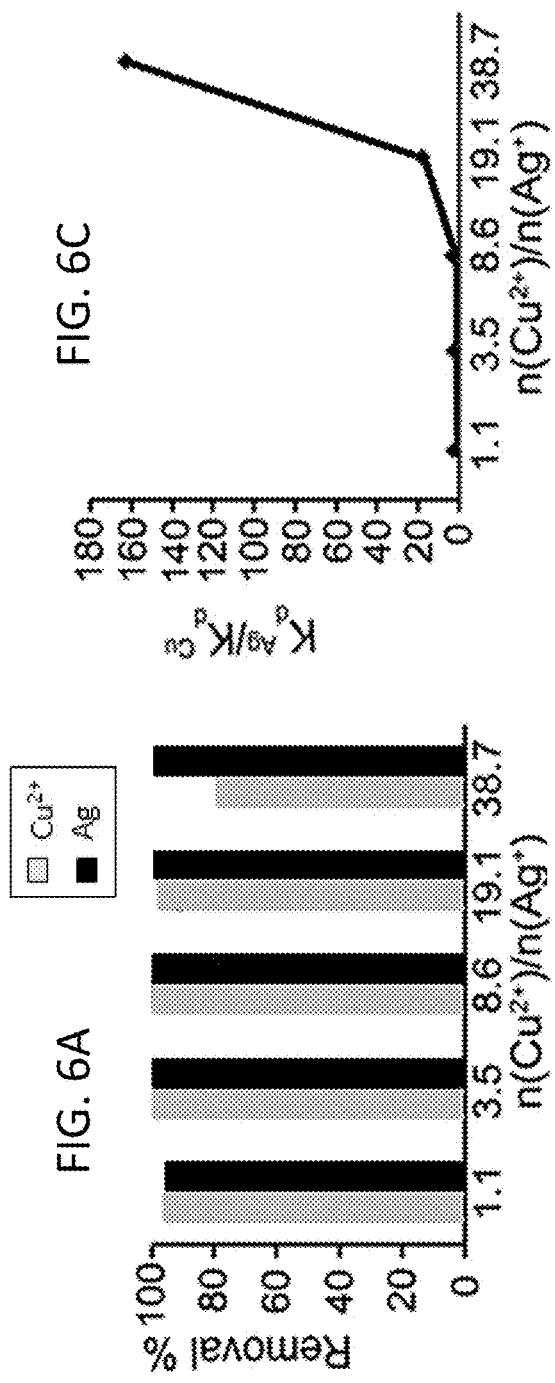
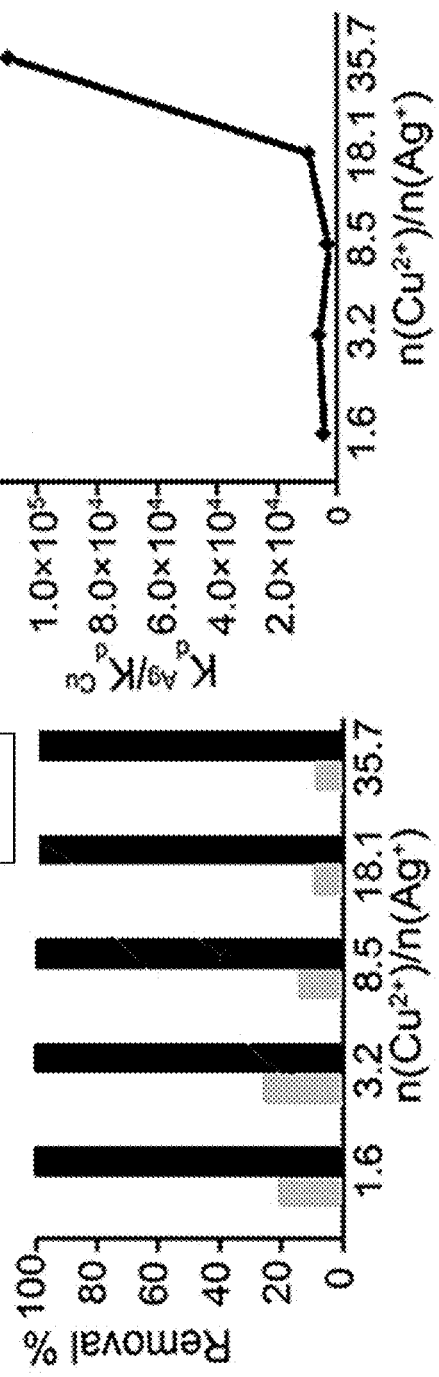
FIG. 6A  FIG. 6C
FIG. 6B  FIG. 6D

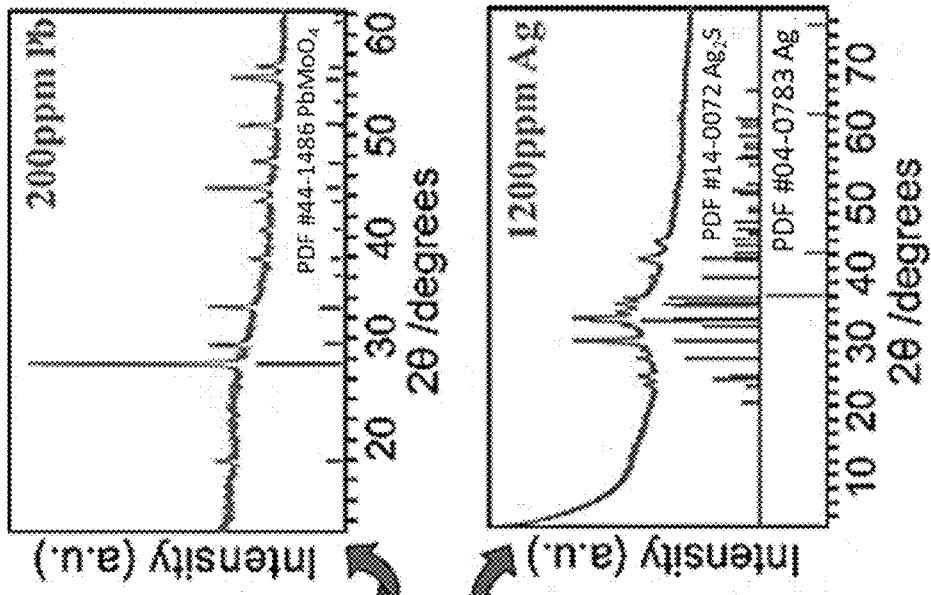
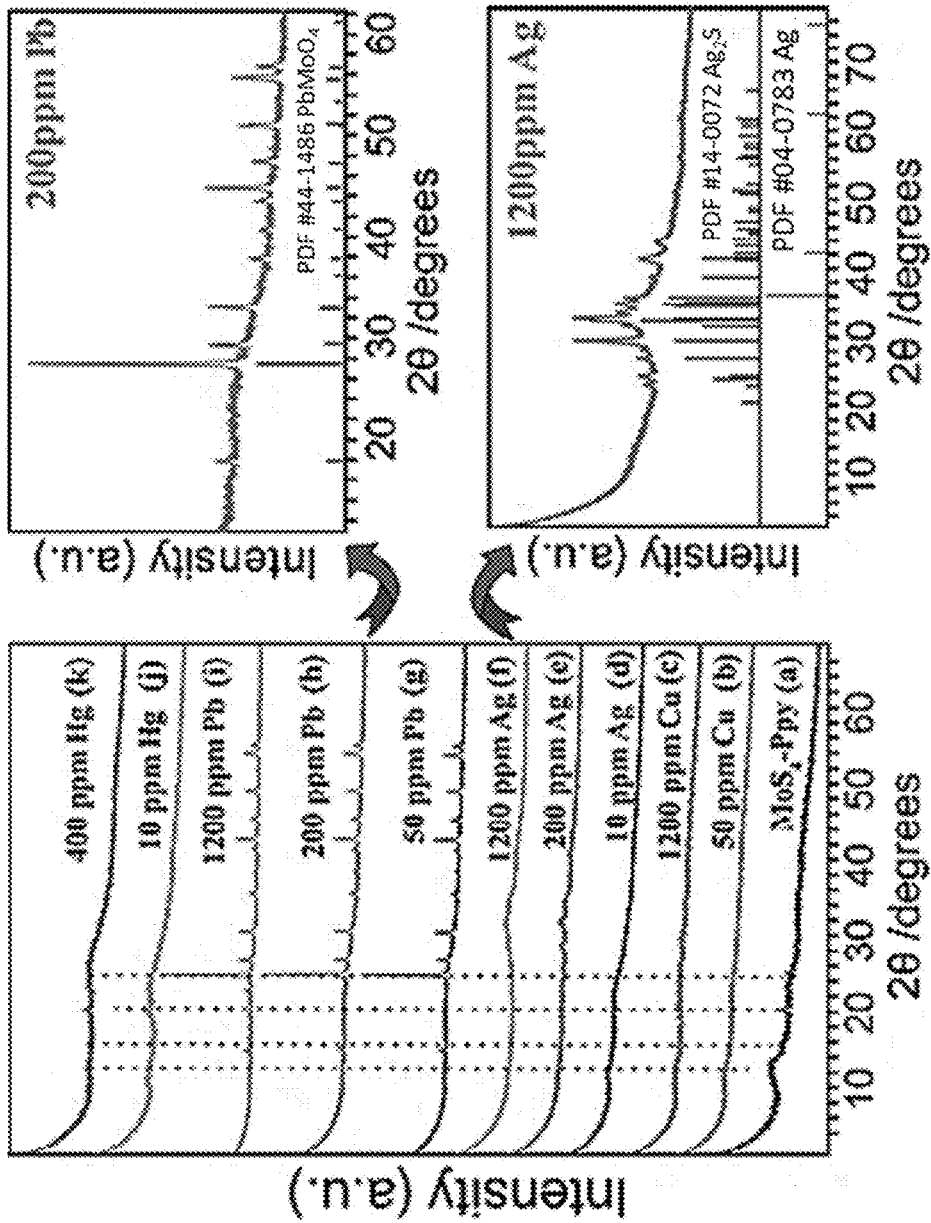
FIG. 7A
FIG. 7B
FIG. 7C

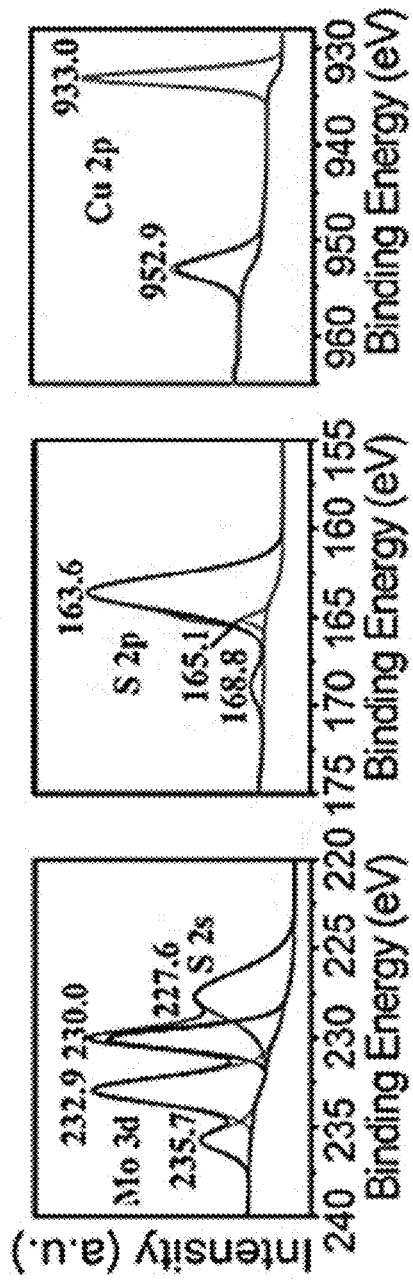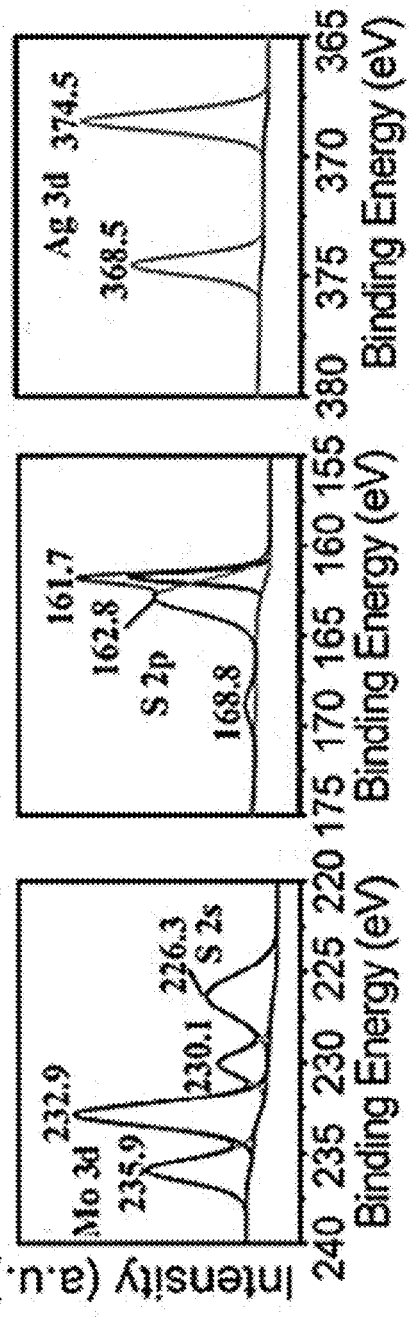

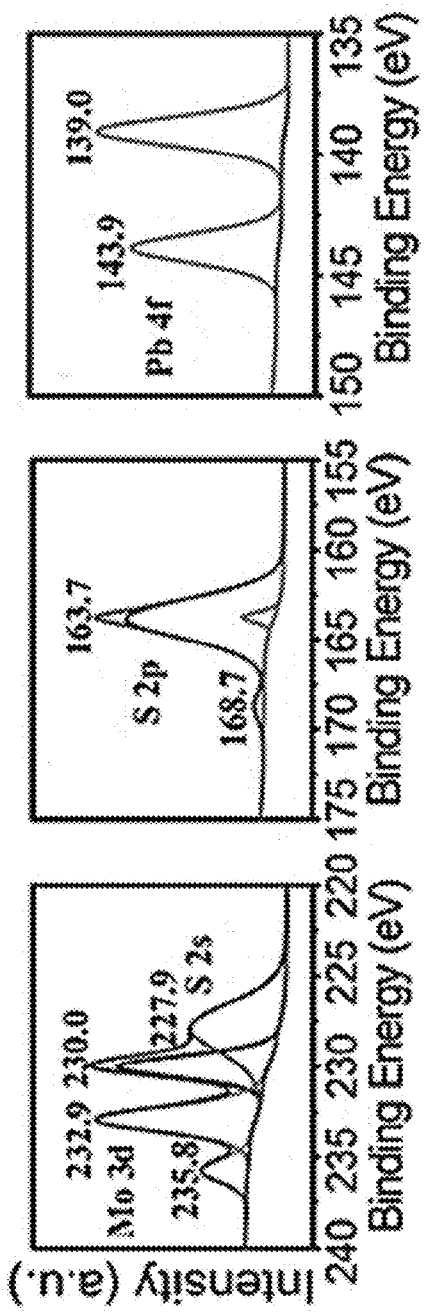
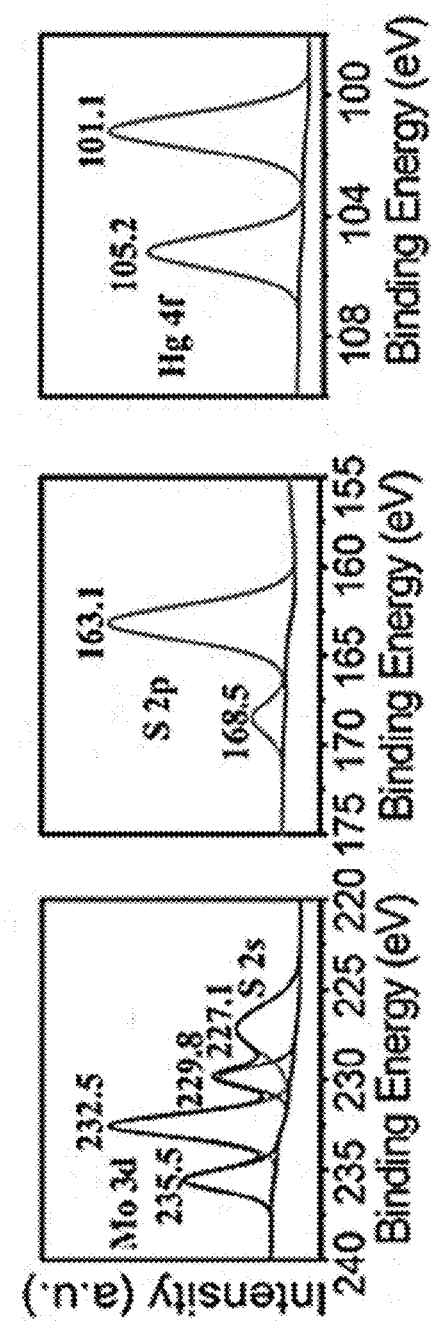

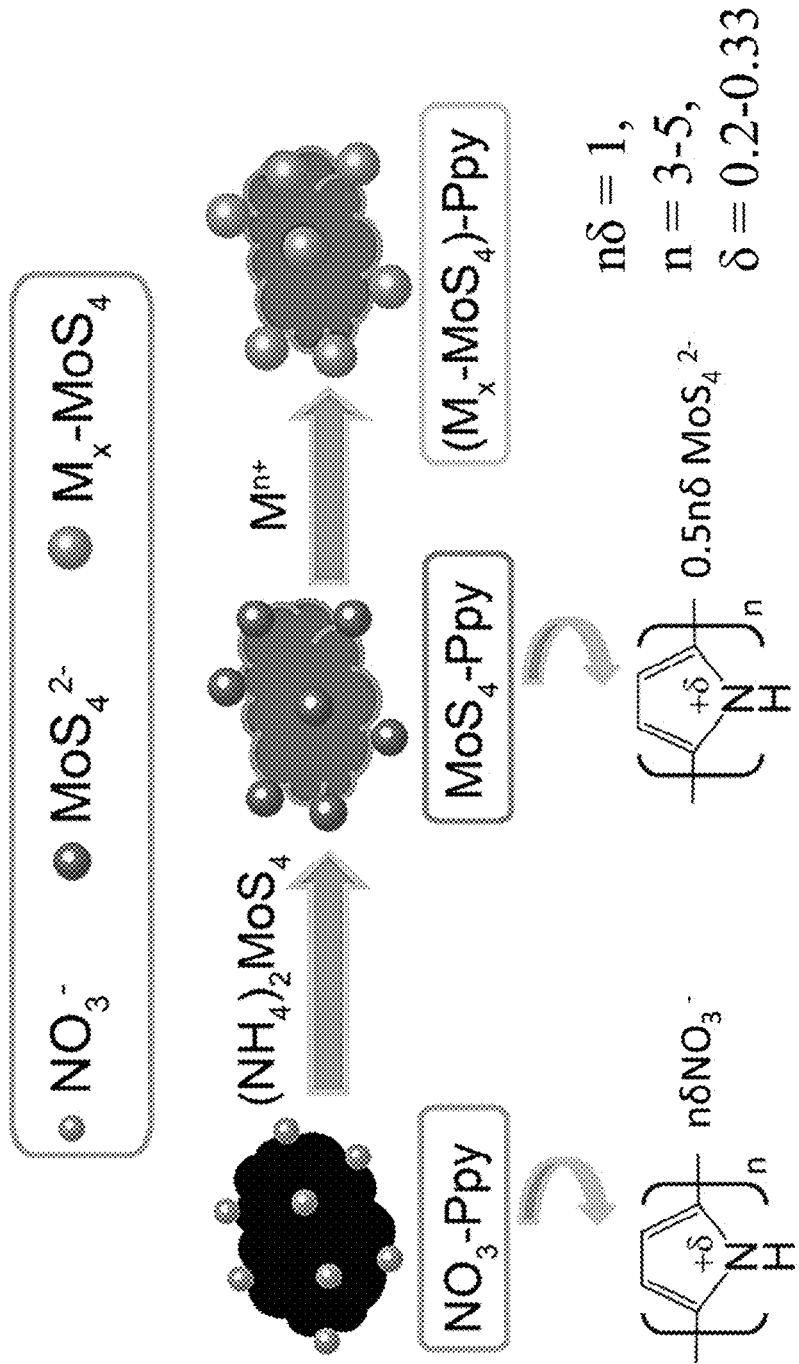

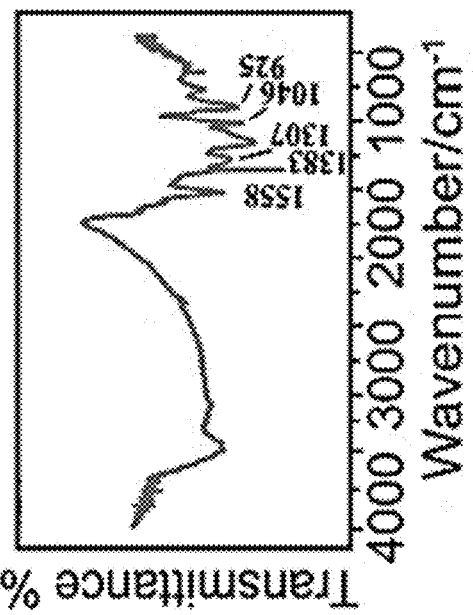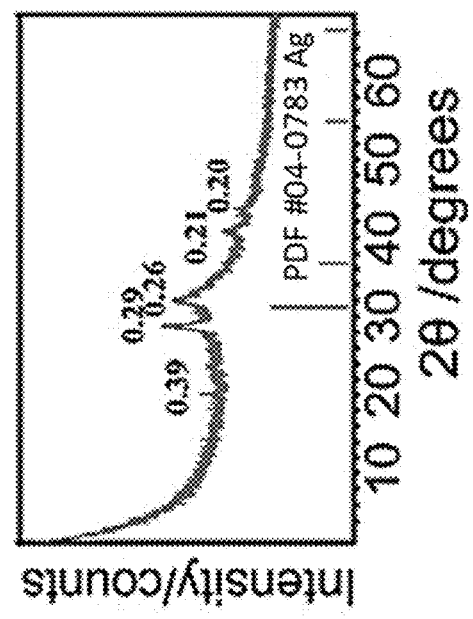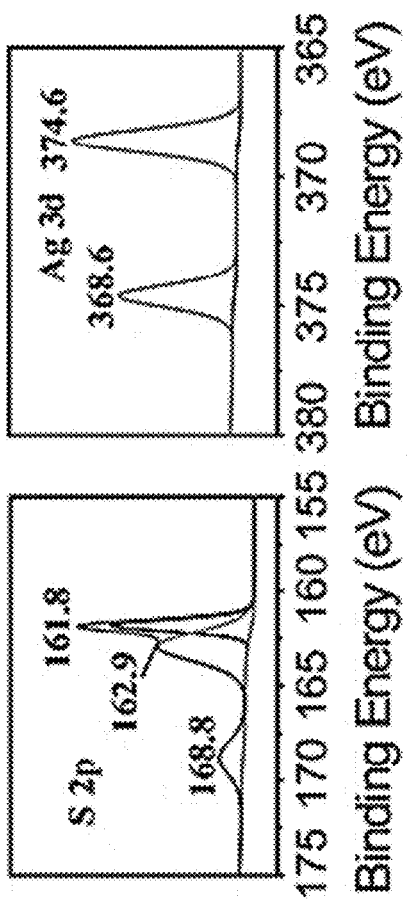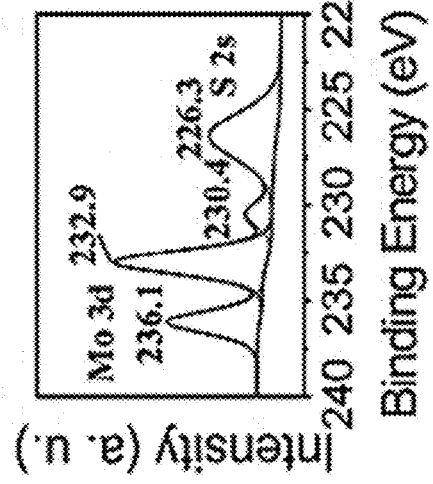
FIG. 13A  FIG. 13B  FIG. 13C  FIG. 13D  FIG. 13E

THIOANION-FUNCTIONALIZED POLYPYRROLES FOR METAL ION CAPTURE

CROSS-REFERENCE TO RELATED APPLICATIONS

The present application is a divisional application of U.S. patent application Ser. No. 16/771,365 filed Jun. 10, 2020, which claims priority as a national stage application of international application no. PCT/US18/65614, filed Dec. 14, 2018, which claims the priority benefit of U.S. provisional patent application No. 62/599,316, filed Dec. 15, 2017, the contents of all of which are incorporated by reference herein in their entirety.

REFERENCE TO GOVERNMENT RIGHTS

This invention was made with government support under DMR-1104965 awarded by the National Science Foundation. The government has certain rights in the invention.

BACKGROUND

Pollution by heavy metal ions from a wide variety of sources is a global environmental issue. Some heavy metal ions such as mercury (Hg) and lead (Pb) are extremely hazardous water pollutants because of high toxicity and carcinogenicity to living organisms, resulting in detrimental effects on the human nervous, blood circulation, immune, and reproductive systems. Silver (Ag), on the other hand, is an important industrial and precious metal, used for various applications such as electronics, catalysis, medical, and sensing materials. It exists in several raw ores such as manganese-silver ore, some natural gold-bearing ores, and complex sulfidic copper mines. Silver also exists in micro-amounts in chalcopyrite ($CuFeS_2$) and galena (PbS), which are widespread ores. Although a one-step process has been developed for the extraction of high-grade silver mineral resources, recovery from low-grade silver ores is of considerable interest because of rapid depletion of high-grade ones and rising demands for silver. (See, Jiang, T., et al., *Hydrometallurgy* 2003, 69 (1-3), 177-186.)

Polypyrrole (Ppy) is a prototypical low cost conductive polymer, and its derivatives have been studied intensely in various fields such as sensors, electrodes, and batteries. Ppy can be easily synthesized by the oxidative polymerization of pyrrole using mild oxidants, and the resulting polymer chains carry positive charges which are neutralized by counter anions (usually nitrate, chloride, perchlorate, and sulfate) which are incorporated into the growing conjugated polymer chain. Recently, a series of Ppy-based materials have been obtained by functionalizing with dodecyl sulfate or octadecyl sulfate, which were utilized as adsorbents for removing deoxyribonucleic acid (DNA) and proteins. (See, Saoudi, B., et al., *Synthetic Met.* 1997, 87 (2), 97-103; and Zhang, X., et al., *Sep. Purif. Technol.* 2006, 52 (1), 161-169.) Ppy composites can also be prepared simply by coating Ppy on the surface of solid substrates such as glass, cloth, paper as powders, fibers, wood, and sawdust (SD). Ppy composites have been reported for metal ion removal from aqueous solutions. (See, Mahmud, H. N. M. E., et al., *RSC Adv.* 2016, 6 (18), 14778-14791.) For example, Ppy/SD was reported to be an efficient sorbent for Cr(VI), relying on the anion exchange property of Ppy. (See, Ansari, R., et al., *React. Funct. Polym.* 2007, 67(4), 367-374.) The magnetic nanocomposite of $Ppy/Fe_3O_4$ was demonstrated to be an adsorbent with an enhanced capacity for Cr(VI) capture. (See, Bhaumik, M., et al., *Hazard. Mater.* 2011, 190 (1-3), 381-390.)

SUMMARY

Polypyrrole polymers functionalized with thioanions, such as molybdenum tetrasulfide, and methods for their use in metal capture applications are provided.

A thioanion-functionalized polypyrrole comprises: a conjugated, positively charged backbone of pyrrole units; and charge-balancing thioanions associated with the conjugated, positively charged backbone of pyrrole units.

A molybdenum tetrasulfide-functionalized polypyrrole comprises: a conjugated, positively charged backbone of pyrrole units; and charge-balancing $MoS_4^{2-}$ anions associated with the conjugated, positively charged backbone of pyrrole units.

An embodiment of a method of removing metal ions from a sample comprising the metal ions, comprises: exposing a thioanion-functionalized polypyrrole to the sample, wherein metal ions are adsorbed by the thioanion-functionalized polypyrrole; and removing the thioanion-functionalized polypyrrole and the absorbed metal ions from the sample.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 1A-1E. (FIG. 1A) IR and (FIG. 1B) Raman spectra of (trace a) $NO_3$-Ppy precursor and (trace b) $MoS_4$-Ppy, X-ray photoelectron spectra (XPS) with the deconvolution of corresponding XPS peaks of (FIG. 1C) Mo 3d and (FIG. 1D) S 2p in $MoS_4$-Ppy, (FIG. 1E) Scanning electron microscope (SEM) image of $MoS_4$-Ppy.

(FIG. 2A) Concentration change following contact time, (FIG. 2B) Removal rate as a function of contact time, (FIG. 2C) Sorption capacity ($q_t$) with contact time, (FIG. 2D) Pseudo-second-order kinetic plots for the sorption.

FIGS. 3A and 3B. Sorption isotherms for sorption of $Ag^+$ by $MoS_4$-Ppy under strong acid (SA) condition. Langmuir equilibrium isotherms were derived from equilibrium concentration ($C_e$, ppm), plotted against the adsorption capacity (FIG. 3A) q (mg/g) and (FIG. 3B) $C_e/q_e$ (g/L).

(FIG. 4A) concentration change following contact time, (FIG. 4B) removal % as a function of contact time, (FIG. 4C) sorption capacity ($q_t$) with contact time, (FIG. 4D) pseudo-second-order kinetic plots.

FIG. 6A-6D. Selectivity towards $Ag^+$ and $Cu^{2+}$ by $MoS_4$-Ppy at (FIG. 6A, FIG. 6C) weak acid (pH~5) and (FIG. 6B, FIG. 6D) strong acid cases (pH~1): (FIG. 6A, FIG. 6B) bar graph of removal rates and (FIG. 6C, FIG. 6D) plots of $SF_{Ag/Cu}$ ($K_d^{Ag}/K_d^{Cu}$) as a function of $n(Cu^{2+})/n(Ag^+)$.

FIG. 7A-7C. (FIG. 7A) The X-ray diffraction (XRD) patterns (FIG. 7A trace a) before and after $MoS_4$-Ppy adsorbed (FIG. 7A trace b, FIG. 7A trace c) $Cu^{2+}$, (FIG. 7A trace d-FIG. 7A trace f) Ag$^+$, (FIG. 7A trace g-FIG. 7A trace i) Pb$^{2+}$, and (FIG. 7A trace j, FIG. 7A trace k) Hg$^{2+}$ at various concentrations, and comparison of XRD patterns at slow scan rates of (FIG. 7B) 200 ppm Pb$^{2+}$ adsorbed sample and (FIG. 7C) 1200 ppm Ag$^+$ and standard patterns of PbMoO$_4$ and Ag$_2$S.

FIG. 8A-8L. X-ray photoelectron spectra with the deconvolution of XPS peaks of samples of the MoS$_4$-Ppy after adsorbed (FIG. 8A, FIG. 8B, FIG. 8C) 1200 ppm Cu$^{2+}$, (FIG. 8D, FIG. 8E, FIG. 8F) 1200 ppm Ag$^+$, (FIG. 8G, FIG. 8H, FIG. 8I) 1200 ppm Pb$^{2+}$, and (FIG. 8J, FIG. 8K, FIG. 8L) 500 ppm Hg$^{2+}$, respectively.

FIG. 9. Schematic diagram showing metal ion remediation by MoS$_4$-Ppy.

(FIG. 11A) IR spectra of (FIG. 11A trace a) NO$_3$-Ppy, (FIG. 11A trace b) MoS$_4$-Ppy, and solid samples after MoS$_4$-Ppy adsorbed higher concentrations of (FIG. 11A trace c, FIG. 11A trace c') Cu$^{2+}$, (FIG. 11A trace d, FIG. 11A trace d') Ag$^+$, (FIG. 11A trace e, FIG. 11A trace e') Pb$^{2+}$, and (FIG. 11A trace f) Hg$^{2+}$; (FIG. 11B) IR spectra of (FIG. 11B trace a) NO$_3$-Ppy, (FIG. 11B trace b) MoS$_4$-Ppy, and solid samples after MoS$_4$-Ppy adsorbed 10 ppm of (FIG. 11B trace c) Co$^{2+}$, (FIG. 11B trace d) Ni$^{2+}$, (FIG. 11B trace c) Cu$^{2+}$, (FIG. 11B trace f) Zn$^{2+}$, (FIG. 11B trace g) Ag$^+$, (FIG. 11B trace h) Pb$^{2+}$, (FIG. 11B trace i) Cd$^{2+}$, (FIG. 11B trace j) Hg$^{2+}$, and (FIG. 11B trace k) their mixed solution. IR spectra of the M$^{n+}$ adsorbed samples presented similar peaks with the original MoS$_4$-Ppy. The intensity of the 1383 cm$^{-1}$ band (NO$_3$$^-$) had little change at low M$^{n+}$ concentrations. However, with the increasing initial concentration of metal ions, the intensity of the 1383 cm$^{-1}$ band was remarkably enhanced, which can be interpreted that more NO$_3$$^-$ entered for the charge balance of the polymer matrix with the increasingly adsorbed amount of the metal ions.

(FIG. 12A) IR spectra (FIG. 12A trace a) before and (FIG. 12A trace b) after MoS$_4$-Ppy was soaked in strong acidic solution (H$_2$O/HNO$_3$, pH~1) for 24 h. (FIG. 12B) UV-Vis absorption spectra of (FIG. 12B trace a) NaNO$_3$ solution (50 mg was dissolved in 100 mL H$_2$O) for comparison, and (FIG. 12B trace b) the supernatant of strong acid-suffered sample of MoS$_4$-Ppy.

FIG. 13A-13E. Solid sample after MoS$_4$-Ppy adsorbed 1500 ppm Ag$^+$ under strong acid condition (pH=0.60): (FIG. 13A) XRD patterns, (FIG. 13B) IR spectra, and X-ray photoelectron spectra with the deconvolution of corresponding XPS peaks of (FIG. 13C) Mo 3d, (FIG. 13D) S 2p, and (FIG. 13E) Ag 3d.

DETAILED DESCRIPTION

Figure 2A:
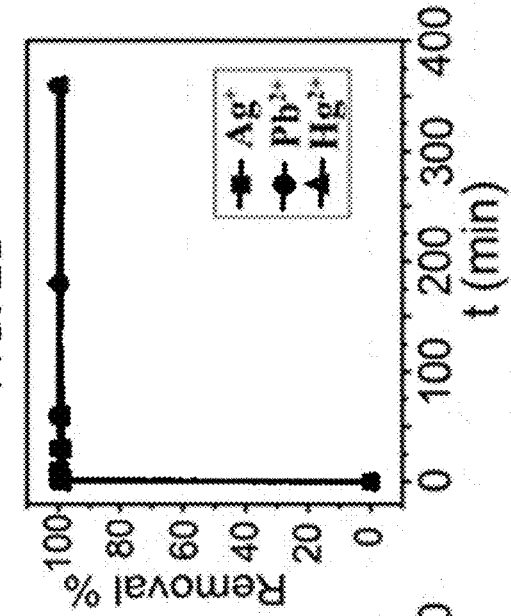
FIG. 2A-2D. Adsorption kinetics curves for $M^{n+}$ ($M^{n+}=Ag^+$, $Pb^{2+}$, $Hg^{2+}$) by $MoS_4$-Ppy.
Figure 2B:
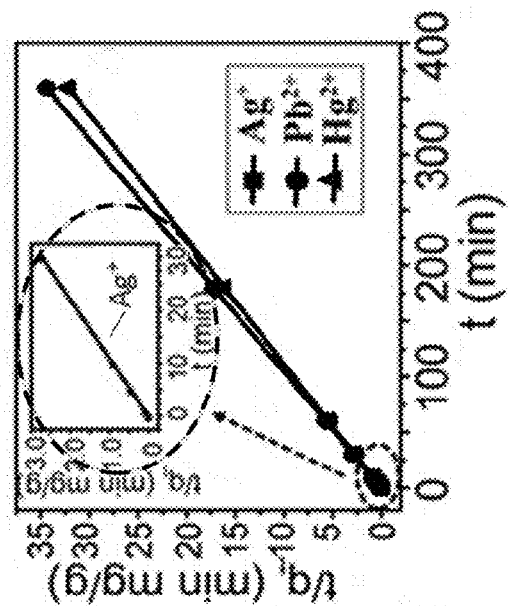
Figure 2C:
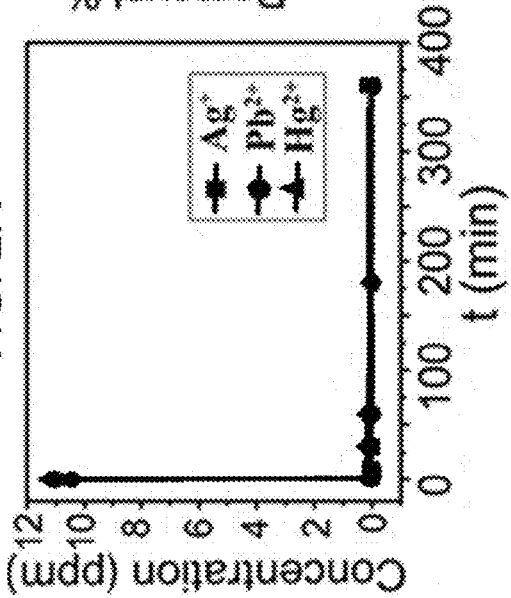
Figure 2D:
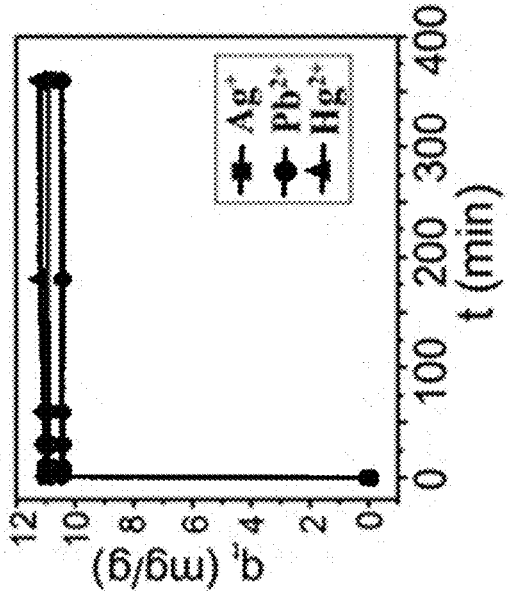
Figure 4A:
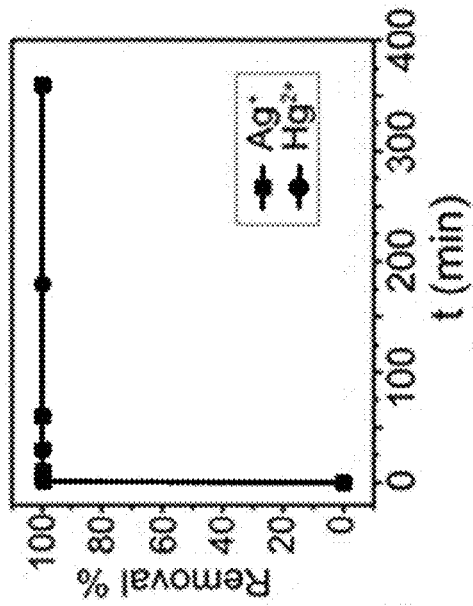
FIG. 4A-4D. Adsorption kinetics curves for $Ag^+$ and $Hg^{2+}$ by $MoS_4$-Ppy under strong acid.
Figure 4B:
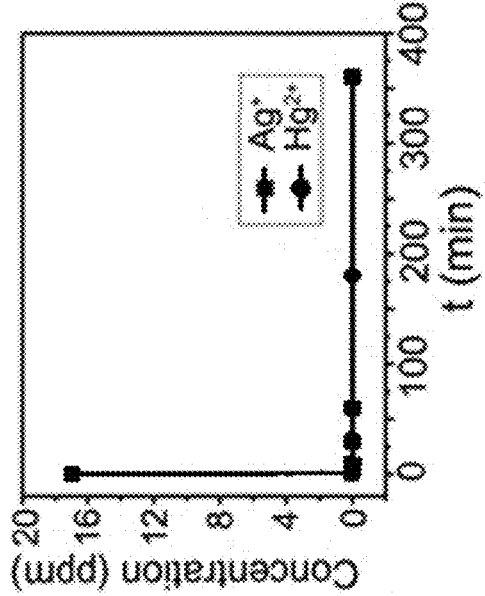
Figure 4C:
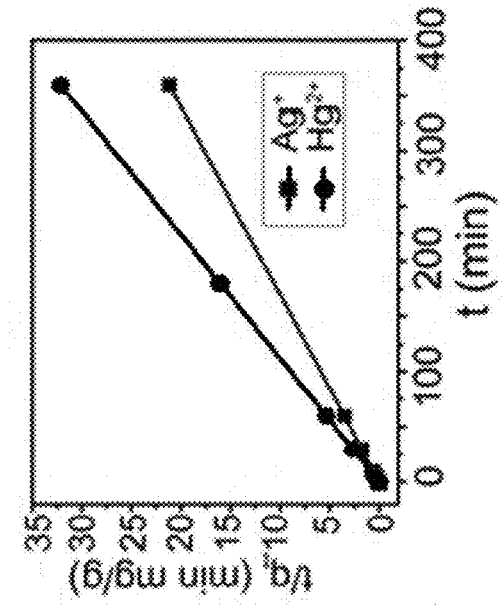
Figure 4D:
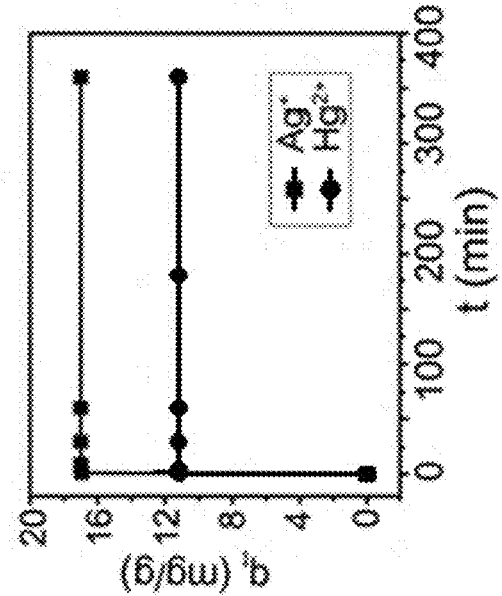

Polypyrrole polymers functionalized with thioanions and methods for their use in metal capture applications are provided. Also provided are methods for making the polypyrroles using anion exchange techniques.

Thioanion-functionalized polypyrroles polymers have a conjugated, positively charged backbone of pyrrole units that is charge-balanced with associated thioanions. Thioanions that can be used as charge-balancing anions include metal-containing anions and non-metal-containing anions, for example, molybdenum thioanions, antimony thioanions, tin thioanions, tungsten thioanions, and phosphorus thioanions. Specific examples include molybdenum tetrasulfide MoS$_4$$^{2-}$, Mo$_3$S$_{13}$$^{2-}$, SbS$_3$$^{3-}$, SbS$_4$$^{3-}$, S$_x$$^{2-}$, wherein x=1, 2, 3, 4, 5, or 6), SH$^{1-}$, Sb$_2$S$_4$$^{4-}$, SnS$_4$$^{4-}$, Sn$_2$S$_6$$^{4-}$, Sn$_4$S$_{10}$$^{4-}$, WS$_4$$^{2-}$ and PS$_{4-x}$O$^{3-}$, wherein (x=1, 2, or 3). The thioanions can be provided in the form of a salt (e.g. an ammonium salt, an alkali metal salt) or other soluble form of the thioanion.

In particular, the molybdenum tetrasulfide-functionalized polypyrroles polymers, which are referred to herein as MoS$_4$-Ppy, have a conjugated, positively charged backbone of pyrrole units that is charge-balanced with associated MoS$_4$$^{2-}$ anions. The structure of the MoS$_4$-Ppy is shown in FIG. 9, where δ (=0.20-0.33) is the doping density, n is the average number of pyrrole monomers in the polypyrrole that contain one unit of positive charge (with nδ=1 and n typically in the range from 3 to 5). NO$_3$$^-$ and MoS$_4$$^{2-}$ are the counteranions. The thioanion-functionalized polypyrroles can be made by carrying out an anion-exchange reaction between a polypyrrole precursor that is charge balanced with NO$_3$$^-$ ions or other precursor anions, such as Cl$^-$ and ClO$_4$$^-$, as demonstrated in the Example.

In methods for metal capture, a sample containing one or more types of metal ions is exposed to the thioanion-functionalized polypyrrole, whereby the metal ions are adsorbed. The thioanion-functionalized polypyrrole, along with the adsorbed metal ions, can then be removed from the sample. The metal ions can then be removed (e.g., desorbed) from the thioanion-functionalized polypyrrole to regenerate the polypyrrole for re-use. For example, hydrochloric acid or nitric acid could be used to regenerate the polypyrrole. In acidic conditions, the polypyrrole may combine with H$^+$ and release the adsorbed metal ions. By filtration or centrifugation, the polypyrrole solids may be separated. Then through adjusting the pH and ion exchange reactions, the thioanion-functionalized polypyrrole may be regenerated for re-use.

Thioanion-functionalized polypyrroles, such as MoS$_4$-Ppy, are characterized by high acid stability and the ability to adsorb a variety of metal ions from a metal ion-containing sample in acidic aqueous solutions. Acidic pH ranges over which metal ions can be adsorbed by the thioanion-functionalized polypyrroles include a pH range from 0.5 to 6. This includes adsorption from samples having a pH of 5 or lower, 4 or lower, 3 or lower, 2 or lower, and 1 or lower. The metal ions that can be adsorbed include transition metal ions and, in particular, Hg$^{2+}$, Ag$^+$, Cu$^{2+}$, Pb$^{2+}$, Cr$^{6+}$, Tl$^+$, and/or Cd$^{2+}$ ions. Thioanion-functionalized polypyrroles, such as MoS$_4$-Ppy, have high adsorption capacities for a variety of metals ions, including Hg$^{2+}$, Ag$^+$, Cu$^{2+}$ Pb$^{2+}$, Cr$^{6+}$, Tl$^+$, and/or Cd$^{2+}$ ions and can remove these ions from an aqueous solution quickly. By way of illustration, 95 weight percent (wt. %) or greater of Hg$^{2+}$, Ag$^+$, Cu$^{2+}$, and/or Pb$^{2+}$ ions can be removed from an aqueous sample in a period of 5 minutes or less using MoS$_4$-Ppy, even when the initial sample contains substantial amounts of one or more of these ions—for example when the initial sample has a concentration of one or more of these ions in the range from about 10 ppm to about 3000 ppm.

Because the rates of metal ion adsorption and the adsorption capacity of the thioanion-functionalized polypyrroles are dependent on solution pH, the pH of the solution can be adjusted to tailor the selectivity of the metal ion adsorption. For example, for certain metal ions, such as silver ions, adsorption is favored at low pH (e.g., pH from ~0.5 to ~4.5), relative to the adsorption of other metal ions, such as copper ions. As a result, the silver ions can be selectively removed from a sample containing both silver and copper ions when the removal process is conducted at a sufficiently low pH. By way of illustration, the selective removal of silver from a sample containing silver and copper can be carried out at a pH in the range from 0.2 to 1.5, including in the range from about 0.5 to 1.

In the metal capture applications, the thioanion-functionalized polypyrrole can be provided in particulate form and loaded onto a porous support substrate to facilitate the introduction of the thioanion-functionalized polypyrrole into, and removal from, a sample. Alternatively, the thioanion-functionalized polypyrrole can be packed into a column through which the sample is passed.

Examples of aqueous samples from which metal ions can be removed using the thioanion-functionalized polypyrroles include drinking water and waste water generated from an industrial plant or from mining processes, such as ore leaching. For example, the thioanion-functionalized polypyrroles can be used to recover silver from silver-containing ores, including low-grade silver ores.

In the example that follows, anion exchange-based methods of making a molybdenum thioanion-functionalized Ppy and methods of removing metal ions from a sample using the molybdenum thioanion-functionalized Ppy are described. However, it should be understood that the procedures described in the example can also be used to make and use Ppy functionalized with other thioanions, such as antimony thioanion-functionalized Ppy, tin thioanion-functionalized Ppy, and phosphorus thioanion-functionalized Ppy, by substituting the appropriate thioanion in the anion exchange reaction.

Unless otherwise indicated, temperature- and/or pressure-dependent values disclosure herein refer to those values at room temperature (23° C.) and atmospheric pressure.

EXAMPLE

In this example, the synthesis of a Ppy material functionalized with the $MoS_4^{2-}$ ions and its capture ability towards heavy metal ions is described. The $MoS_4$-Ppy material exhibited excellent uptake capacity and highly selective removal for $Ag^+$, $Hg^{2+}$, and $Pb^{2+}$, especially in strongly acidic conditions (pH≈1). $MoS_4$-Ppy also displayed remarkable selectivity for $Ag^+$ over $Cu^{2+}$ both in weakly acidic and strongly acidic conditions, making it useful for the direct separation and extraction of silver from low-grade copper minerals. Thus, because of its surprisingly strong chemical stability, $MoS_4$-Ppy is an exceptional adsorbent for the remediation of heavy metal polluted water under both weak and strong acidic conditions.

EXPERIMENTAL SECTION

Synthesis of $NO_3$-Ppy precursor. $NO_3$-Ppy precursor was synthesized via a readily oxidation-polymerization method using $Fe^{3+}$ salts as the oxidant and deionized water as solvent. As formed, the pyrrole conjugated backbone is partially oxidized and charge balanced with $NO_3^-$ ions from $Fe(NO_3)_3 \cdot 9H_2O$. (See, Zhang, X., et al., *Langmuir* 2003, 19(26), 10703-10709.) The oxidative reaction is shown in Scheme 1, below.

Scheme 1. Oxidative reaction of pyrrole doped with $NO_3^-$.

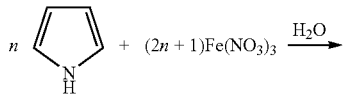

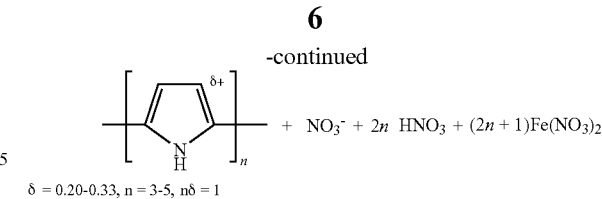

$\delta = 0.20\text{-}0.33, n = 3\text{-}5, n\delta = 1$

In detail, 0.69 mL pyrrole (0.01 mol) was firstly mixed with 94 mL deionized water, then an amount of 50 mL $Fe(NO_3)_3 \cdot 9H_2O$ solution (0.023 mol) was added dropwise, with magnetic stirring in the dark for 24 h. A black precipitate was formed immediately and isolated with filtration, washed several times with deionized water and ethanol, and vacuum dried for about 8 h. Determined by elemental CHN analyses, the as-obtained $NO_3$-Ppy product had a composition of $(C_4H_5N)(NO_3)_{0.25}$.

Preparation of $MoS_4$-Ppy. $MoS_4$-Ppy was prepared by an ion-exchange reaction between the $NO_3^-$ of $NO_3$-Ppy and the $MoS_4^{2-}$ of $(NH_4)_2MoS_4$. In detail, 0.15 g of $NO_3$-Ppy was dispersed in 5 mL deionized water with ultrasonic treatment. Then, the $(NH_4)_2MoS_4$ solution (0.45 g $(NH_4)_2MoS_4$ was dissolved in 10 mL deionized water) was added dropwise into the above dispersion. The mixture was stirred for 72 h to ensure complete ion-exchange. Consequently, 0.275 g of black $MoS_4$-Ppy was obtained by filtration, washing thoroughly and vacuum drying for 24 h. The composition was determined using CHN and Mo analysis by inductively coupled plasma atomic emission spectroscopy (ICP-AES).

Heavy metal uptake experiments. Adsorption experiments were conducted with solutions of various concentrations containing single metal ions or their mixtures using a batch method. Eight metal ions of $Co^{2+}$, $Ni^{2+}$, $Cu^{2+}$, $Zn^{2+}$, $Ag^+$, $Pb^{2+}$, $Cd^{2+}$, and $Hg^{2+}$ were obtained from their nitrate salts. 0.02 g $MoS_4$-Ppy solid was mixed with 20 mL (V/m=1000 mL/g) of each solution and stirred for 6 h. After the adsorption experiments were completed, centrifugation was conducted, and the solid samples were dried in air for further characterization. Meanwhile, the supernatant solutions and their mother solutions were all analyzed using ICP-AES as well as inductively coupled plasma-mass spectroscopy (ICP-MS) for extra low metal ion concentrations.

Selectivity uptakes towards metal ions ($Co^{2+}$, $Ni^{2+}$, $Cu^{2+}$, $Zn^{2+}$, $Ag^+$, $Pb^{2+}$, $Cd^{2+}$, and $Hg^{2+}$). A solution including the mixture of metal ions (~10 ppm for each ion) was used for the study of relative selectivity. The same V/m value of 1000 mL/g and similar operation conditions were used for proper comparison.

For relative selectivity studies towards $Ag^+$, $Pb^{2+}$ and $Hg^{2+}$ under both weak and strong acidic conditions, solutions containing a mixture of $Ag^+$, $Pb^{2+}$ and $Hg^{2+}$ were prepared at the concentration of ~20 ppm for each ion. For the strong acid case, the as-prepared mixed solution was then adjusted to pH≈1 using 0.1 M $HNO_3$. Very small amounts of $MoS_4$-Ppy (0.002 g and 0.004 g) were used with 20 mL of the $Ag^+$, $Pb^{2+}$, and $Hg^{2+}$ solutions (V/m is 10000 or 5000 mL/g) and stirred for 6 h.

For determining the selectivity for $Ag^+$ and $Cu^{2+}$ under both weak and strong acid conditions, a series of solutions with $Ag^+$ and $Cu^{2+}$ were prepared. The initial $Ag^+$ concentration was fixed to ~1 ppm in each mixture, and the concentrations of $Cu^{2+}$ were designed to ~1, ~2, ~5, ~10, ~20 ppm, respectively, and the local pH values were about 5.3~5.6, meaning the weak acidic condition. For the strong acid case, solutions were prepared as above and then the pH values were adjusted to ~1 using 0.1 M $HNO_3$. An amount of 0.02 g $MoS_4$-Ppy solid was added to 20 mL (V/m=1000 ml/g) of each solution and stirred for 24 h.

Equilibrium adsorption isotherm studies for $Cu^{2+}$, $Ag^+$, $Pb^{2+}$, and $Hg^{2+}$. The concentrations of the $Cu^{2+}$, $Ag^+$, $Pb^{2+}$, and $Hg^{2+}$ ions were in the range of 10~2000 ppm to ensure adsorption equilibration was achieved. An amount of 0.02 g $MoS_4$-Ppy powder added in 20 mL solution was used to have a V/m value of 1000 mL/g. The contact time was about 24 h.

Adsorption kinetics of $Ag^+$, $Pb^{2+}$ and $Hg^{2+}$. An amount of 0.04 g $MoS_4$-Ppy powder was added into the 40 mL (V/m=1000 mL/g) solution with a concentration of ~10 ppm, undergoing vigorous stirring continuously for 1 min, 5 min, 10 min, 30 min, 1 h, 3 h, and 6 h. The contact time was varied to check the adsorption kinetics.

pH effect on the uptake of $Ag^+$, $Pb^{2+}$ and $Hg^{2+}$. $Ag^+$ solutions with different concentrations adjusted to strong acid condition (pH≈1) using 0.1 M $HNO_3$ were prepared for determining the sorption capacity and kinetics. For $Pb^{2+}$ and $Hg^{2+}$, the sorption kinetics were measured under strong acid condition (pH≈1) using concentrations of ~10 ppm for each ion. Solutions of single ions of $Ag^+$ and $Pb^{2+}$ with a fixed concentration of ~20 ppm and varying pH values from 0.5 to 6.0 were prepared for further studies of the pH effect on capture efficiency (% removal). The results obtained of this section involved three parts: (1) sorption capacity of $Ag^+$; (2) sorption kinetics of $Ag^+$, $Pb^{2+}$ and $Hg^{2+}$, respectively; and (3) capture efficiency of $Ag^+$ and $Pb^{2+}$ within a broad pH range of 0.5 to 6.0. The amount of $MoS_4$-Ppy, volume of each solution, and contact time were the same as described above.

Adsorption capability of $NO_3$-Ppy towards heavy metals. These were carried out as control experiments since this material does not contain $MoS_4^{2-}$ ions. A solution containing eight metal ions together at an initial concentration of ~10 ppm for each, and solutions containing single $Cu^{2+}$, $Ag^+$, $Pb^{2+}$, and $Hg^{2+}$, were prepared for uptake experiments. An amount of 0.02 g $NO_3$-Ppy powder was mixed with 20 mL (V/m=1000 mL/g) solution and underwent stirring for 6 h.

Chemical stability of $MoS_4$-Ppy in strong acid conditions. An amount of 0.1 g $MoS_4$-Ppy powder was added into a 20 mL $H_2O/HNO_3$ solution and the pH value was adjusted to 1.0. After 24 h stirring, the solids were isolated and dried for IR spectroscopy and CHN analyses. The supernatant solution was used for UV-Vis spectroscopic analysis.

Data treatment. The distribution coefficient ($K_d$) is defined by the equation of $K_d=(V[(C_0-C_f)/C_f])/m$, where $C_0$ and $C_f$ are respectively the initial and equilibrium concentrations of $M^{n+}$ (ppm, μg/mL) after the contact, V is the solution volume (mL), and m is the solid amount (g). The % removal is calculated with the equation of $100\times(C_0-C_f)/C_0$. The removal capacity ($q_m$) is given by the equation: $q_m=10^{-3}\times(C_0-C_f)\cdot V/m$. In general, the adsorption experiments were performed with V:m ratios of 1000 mL/g at ambient temperature.

Characterization techniques. The XRD patterns of solid samples were collected using a PANalytical X'pert Pro MPD diffractometer with Cu—Kα radiation at room temperature, with step size of 0.0167°, scan time of 10 s per step, and 2θ ranging from 4.5 to 70°. Fourier transformed infrared (FT-IR) spectra of the samples were recorded on a Nicolet-380 Fourier-Transform infrared spectrometer using the KBr pellet method. Raman spectra were recorded from 100 to 2000 $cm^{-1}$ on a microscopic confocal Raman spectrometer (LabRAMAramis Horiba Jobin Yvon), using a 532 nm He—Ne laser. SEM and Energy disperse spectroscopy (EDS) measurements were carried out using a Hitachi S-4800 microscope. XPS of the solid samples after the adsorption experiments were performed using an ESCALAB 250Xi spectrometer (Thermofisher). The peaks were fitted using the software Avantage.

The metal ion contents in solid samples were determined by ICP-AES (Jarrel-ASH, ICAP-9000), and a 0.1 M $HNO_3$ solution was used to dissolve them. The metal ion concentrations in supernatant solutions before and after adsorptions were measured using ICP-AES technique and for extra low concentrations, inductively coupled plasma-mass spectroscopy (ICP-MS, NexION 300X) was used. C, H and N contents of the solid samples were determined using an Elementar Vario EL elemental analyzer. The chemical formulas of the samples were determined from the results of ICP and CHN elemental analyses. The pH of the solutions was monitored before after the adsorption using a Sartorius universal type pH meter (PB-10).

Results and Discussion

Synthesis and characterization of Ppy-based materials. The $NO_3$-Ppy polymer precursor was synthesized via oxidative polymerization using pyrrole and $Fe(NO_3)_3$. Here $NO_3^-$ ions from $Fe(NO_3)_3 \cdot 9H_2O$ were retained to maintain the electroneutrality of the partially oxidized polymer conjugated backbone. The $MoS_4$-Ppy was prepared by an ion-exchange reaction of $NO_3$-Ppy with a solution of $(NH_4)_2MoS_4$. Based on ICP and CHN analyses, the stoichiometric compositions of $NO_3$-Ppy and $MoS_4$-Ppy were $(C_4H_3N)\cdot(NO_3)_{0.25}\cdot 0.5H_2O$ and $(C_4H_3N)(MoS_4)_{0.12}(NO_3)_{0.01}\cdot 2.8H_2O$ (see Table 11). The four pyrrole rings carried one positive charge in the Ppy matrix.

TABLE 11

Chemical compositions for the $NO_3$-Ppy precursor and the $MoS_4$-Ppy composite.

| Samples | Chemical formula | Wt. %, found (calcd) | | | |
|---|---|---|---|---|---|
| | | C | H | N | Mo |
| $NO_3$-Ppy | $(C_4H_3N)\cdot(NO_3)_{0.25}\cdot 0.5H_2O$ | 53.32 | 3.82 | 19.39 | — |
| | | (53.63) | (4.47) | (19.55) | — |
| $MoS_4$-Ppy | $(C_4H_3N)\cdot(MoS_4)_{0.12}(NO_3)_{0.01}\cdot 2.8H_2O$ | 32.84 | 5.86 | 9.93 | 9.01 |
| | | (33.59) | (6.02) | (9.90) | (8.06) |

The found data (experimental data) were obtained by CHN and ICP analyses, and the calcd data (theoretical data) were determined based on the chemical formula to test its rationality.

The found data (experimental data) were obtained by CHN and ICP analyses, and the calcd data (theoretical data) were determined based on the chemical formula to test its rationality.

Fourier Transform Infrared (FT-IR), Raman, XPS spectroscopy and SEM were used to characterize the compositions and structure of the samples. The IR absorption bands at 1539, 1302, 1036 and 891/921 $cm^{-1}$ (FIG. 1A) were observed in both $NO_3$-Ppy and $MoS_4$-Ppy, corresponding to C=C stretching, ring stretching modes of Ppy, C—H in-plane deformation vibration, and C—H out-of-plane bending. Moreover, the peak at 1383 $cm^{-1}$ indicated the presence of $NO_3^-$ anions of the $NO_3$-Ppy, and became extremely weak in $MoS_4$-Ppy (FIG. 1A trace b), revealing a nearly complete ion-exchange. The Raman spectra (FIG. 1B) show additional information about the structure of $NO_3$-Ppy precursor (FIG. 1B trace a) and the $MoS_4$-Ppy composite (FIG.

1B trace b). The main peaks at 1563, 1332, 1040, and 979 cm$^{-1}$ (FIG. 1B trace a) were attributed to C=C backbone stretching, ring stretching mode of Ppy, in-plane and out-of-plane vibration of N—H modes, respectively. The MoS$_4$-Ppy shows similar peaks (FIG. 1B trace b), as well as new peaks at 550 and 453 cm$^{-1}$, where the latter peak belonged to Mo—S stretching according to reference values (477 and 457 cm$^{-1}$) of free (NH$_4$)$_2$MoS$_4$. The blue shift of the two peaks was likely caused by the change of chemical environment of Mo—S bonds after the insertion of MoS$_4^{2-}$ into the Ppy structure.

The chemical states of Mo and S in MoS$_4$-Ppy were determined by XPS spectroscopy (FIG. 1C and FIG. 1D). The spectral peaks at 235.8 eV (Mo$^{VI}$ 3d$_{3/2}$) and 233.1 (Mo$^{VI}$ 3d$_{5/2}$) eV (FIG. 1C) indicate the Mo$^{6+}$ oxidation state as expected for the presence of the MoS$_4^{2-}$ group. The weak peak at 227.8 eV (FIG. 1C) belongs to the S 2s energy. In addition, the two peaks at 165.2 (S 2p$_{1/2}$) and 163.7 eV (S 2p$_{3/2}$) deriving from S 2p energy represent the S$^{2-}$ groups (FIG. 1D), and the weak peak at 168.8 eV suggests the presence of a small quantity of SO$_4^{2-}$ impurity originating from adventitious oxidation of S$^{2-}$. SEM images of the MoS$_4$-Ppy (FIG. 1E) show a granular morphology with a granule size of ~300 nm.

Heavy metal removal. The uptake of heavy metal ions by MoS$_4$-Ppy from aqueous solutions of various concentrations (10-2000 ppm) was studied with the batch method at room temperature (~23° C.). The affinity of MoS$_4$-Ppy for the M$^{n+}$ ions can be expressed in terms of the distribution coefficient K$_d^M$. The adsorption behavior towards single ions of Co$^{2+}$, Ni$^{2+}$, Cu$^{2+}$, Zn$^{2+}$, Ag$^+$, Pb$^{2+}$, Cd$^{2+}$, and Hg$^{2+}$ (at ~10 ppm initial concentration) is shown in Table 1. The removing ability is poor for Co$^{2+}$, Ni$^{2+}$, Zn$^{2+}$, Cd$^{2+}$ but excellent for Cu$^{2+}$, Pb$^{2+}$, Ag$^+$, and Hg$^{2+}$ (at the local pH during the preparation of the corresponding ion solutions). For Cu$^{2+}$ and Ag$^+$, 95.9% and 98.5% removal rates were reached, respectively, and for toxic Pb$^{2+}$ and Hg$^{2+}$, 99.99% removals were achieved, all of which exhibit high capture ability for these ions.

TABLE 1

Absorption data of MoS$_4$-Ppy towards eight individual ions.[a]

| ions | C$_0$ (ppm) | C$_f$ (ppm) | Removal (%) | K$_d$ (mL/g) |
|---|---|---|---|---|
| Co$^{2+}$[b] | 9.80 | 9.00 | 9.19 | 88.9 |
| Ni$^{2+}$[c] | 9.36 | 8.51 | 0.09 | 99.9 |
| Cu$^{2+}$[d] | 9.26 | 0.28 | 95.90 | 2.3 × 10$^4$ |
| Zn$^{2+}$[e] | 8.94 | 8.71 | 2.57 | 26.4 |
| Ag$^+$[f] | 7.99 | 0.12 | 98.50 | 6.6 × 10$^4$ |
| Pb$^{2+}$[g] | 10.46 | <0.001 | 99.99 | >1.1 × 10$^7$ |
| Cd$^{2+}$[h] | 9.04 | 7.92 | 16.37 | 1.4 × 10$^2$ |
| Hg$^{2+}$[i] | 11.2 | <0.001 | 99.99 | >1.1 × 10$^7$ |

[a] m = 0.02 g, V = 20 mL, V/m = 1000 mL/g; contact time: 6 h.
pH value:
[b] 5.13 → 3.34,
[c] 5.25 → 3.38,
[d] 4.60 → 3.15,
[e] 5.30 → 3.38,
[f] 5.11 → 3.17,
[g] 4.74 → 3.28,
[h] 5.36 → 3.44,
[i] 2.07 → 2.12.

In order to explore the competitive capture of these ions, uptake experiments were carried out on mixtures of all the eight ions (Table 2). The selectivity order was determined to be Co$^{2+}$, Ni$^{2+}$, Zn$^{2+}$, Cd$^{2+}$<<Cu$^{2+}$<Pb$^{2+}$<Hg$^{2+}$<Ag$^+$ (pH~3.4, the lower pH resulted from the added nitrate acid when dissolving Hg(NO$_3$)$_2$). For Cu$^{2+}$ and Ag$^+$, the K$_d$ values reached 2.2×10$^4$ and 1.1×10$^7$ mL/g, respectively, and K$_d$ for Pb$^{2+}$ and Hg$^{2+}$ were >1.2×10$^7$ and >1.8×10$^6$ mL/g. In the mixture of ions, the removal of Ag$^+$ was increased (99.99%) and the K$_d^{Ag}$ was 170-fold (=(1.1×10$^7$)/(6.6×10$^4$)) higher than that in the single ion case. The lower pH value was deduced to favor the capture of Ag$^+$, as demonstrated below in the studies of the pH effect.

TABLE 2

Absorption data of MoS$_4$-Ppy towards the mixture of eight ions.[a,b]

| single ions | C$_0$ (ppm) | C$_f$ (ppm) | Removal (%) | K$_d$ (mL/g) |
|---|---|---|---|---|
| Co$^{2+}$ | 10.39 | 10.11 | 2.69 | 27.7 |
| Ni$^{2+}$ | 10.56 | 10.40 | 1.52 | 15.4 |
| Cu$^{2+}$ | 10.16 | 0.44 | 95.67 | 2.2 × 10$^4$ |
| Zn$^{2+}$ | 15.54 | 14.83 | 4.57 | 47.9 |
| Ag$^+$ | 11.09 | <0.001 | 99.99 | >1.1 × 10$^7$ |
| Pb$^{2+}$ | 11.65 | <0.001 | 99.99 | >1.2 × 10$^7$ |
| Cd$^{2+}$ | 11.04 | 10.40 | 5.80 | 61.5 |
| Hg$^{2+}$ | 13.32 | 0.008 | 99.94 | 1.8 × 10$^6$ |

[a] m = 0.04 g, V = 40 mL, V/m = 1000 mL/g; contact time: 6 h.
[b] pH value: 3.41 → 3.05.

Relative selectivity for Ag$^+$, Pb$^{2+}$ and Hg$^{2+}$. As shown above, the MoS$_4$-Ppy captured Ag$^+$, Pb$^{2+}$ and Hg$^{2+}$ effectively, and the K$_d$ values reached 10$^6$~10$^7$ mL/g (Table 2). In order to determine the relative selectivity among Ag$^+$, Pb$^{2+}$, and Hg$^{2+}$, a solution containing only these three ions (~20 ppm for each ion) was investigated. In this case, decreased quantities (0.002 and 0.004 g) of the MoS$_4$-Ppy adsorbent were used so that the quantity was inadequate to capture all three ions. The separation factors (SF$_{A/B}$) defined by K$_d^A$/K$_d^B$ were used to assess the separation degree of one ion from the other. As shown in Table 3, when using 0.002 g (1/10 of 0.02 g) MoS$_4$-Ppy, the SF$_{Ag/Pb}$, SF$_{Hg/Pb}$, and SF$_{Ag/Hg}$ values were about 27.0 (=(1.7×10$^4$)/(6.3×10$^2$)), 5.1 (=(3.2×10$^3$)/(6.3×10$^2$)), and 5.3 (=(1.7×10$^4$)/(3.2×10$^3$)), respectively, showing a higher selectivity for Ag$^+$ and Hg$^{2+}$ than for Pb$^{2+}$. When 0.004 g (1/5 of 0.02 g) MoS$_4$-Ppy was used, the removals of Ag$^+$, Hg$^{2+}$ and Pb$^{2+}$ were 82.8%, 62.4% and 13.6%, respectively, confirming the much higher removal efficiency for Ag$^+$ and Hg$^{2+}$ than for Pb$^{2+}$. Thus, MoS$_4$-Ppy possesses its highest affinity and the most efficient removal for Ag$^+$ among the three ions, following the selectivity order of Ag$^+$>Hg$^{2+}$>Pb$^{2+}$.

TABLE 3

Selective adsorption results of MoS$_4$-Ppy for Pb$^{2+}$, Ag$^+$ and Hg$^{2+}$.[a]

| MoS$_4$-Ppy | 0.002 g [b] | | | 0.004 g [c] | | |
|---|---|---|---|---|---|---|
| | Ag$^+$ | Pb$^{2+}$ | Hg$^{2+}$ | Ag$^+$ | Pb$^{2+}$ | Hg$^{2+}$ |
| C$_0$ (ppm) | 23.9 | 22.1 | 21.0 | 23.9 | 22.1 | 21.0 |
| C$_f$ (ppm)-6 h | 12.2 | 20.8 | 15.9 | 4.1 | 19.1 | 7.9 |
| K$_d$ (mL/g)-6 h | 1.7 × 10$^4$ | 6.3 × 10$^2$ | 3.2 × 10$^3$ | 2.4 × 10$^4$ | 7.9 × 10$^2$ | 8.3 × 10$^3$ |
| Removal (%) | 49.0 | 1.4 | 24.3 | 82.8 | 13.6 | 62.4 |
| pH-6 h | | 2.85 → 2.84 | | | 2.85 → 2.81 | |

[a] 20-ml solution of AgNO$_3$, Pb(NO$_3$)$_2$ and Hg(NO$_3$)$_2$, 20 ppm concentration per ion.
[b] V/m = 10000 mL/g,
[c] V/m = 5000 mL/g Uptake capacity towards Cu$^{2+}$, Ag$^+$, Pb$^{2+}$ and Hg$^{2+}$. From the results for single metal ions (Table 1) and mixtures of ions (Table 2) described above, it is clear that the MoS$_4$-Ppy exhibited efficient removal for Ag$^+$, Hg$^{2+}$, Cu$^{2+}$, and Pb$^{2+}$. Thus, the maximum adsorption capacities (q$_m$) towards the four ions were determined using adsorption equilibrium studies. For Ag$^+$ (Table 4), drastically higher q$_m$$^{Ag}$ of 480 mg/g was observed using a concentration range of 10 to 1200 ppm, showing an outstanding capacity for Ag$^+$ by MoS$_4$-Ppy. The Ag$^+$ capacity of 480 mg/g was higher than previously reported absorbents such as S$_x$-LDH (383 mg/g), MoS$_4$-LDH (452 mg/g), and KMS-2 (408 mg/g). (See, Ma, S. L., et al., *J. Mater. Chem. A* 2014, 2 (26), 10280-10289; Ma, L. J.; Wang, Q., et al., *J. Am. Chem. Soc.* 2016, 138 (8), 2858-2866; and Hassanzadeh Fard, Z., et al., *Chem. Mater.* 2015, 27 (6), 1925-1928.) The corresponding q$_m$ values for Pb$^{2+}$, Cu$^{2+}$ and Hg$^{2+}$ were 78, 111, and 210 mg/g (Table 12-14). For the highly toxic Hg$^{2+}$, the high removal of >99.8% and K$_d$ values of 6×10$^5$-1×10$^8$ mL/g both indicate excellent uptake. The performance of previously reported absorbents are listed in Table 5 for comparison. It is apparent from these results that MoS$_4$-Ppy exhibits a much higher sorption capacity than the reported materials.

TABLE 4

Sorption data of MoS$_4$-Ppy towards Ag$^+$.[a]

| C$_0$ (ppm) | C$_f$ (ppm) | Removal (%) | q$_m$ (mg/g) | K$_d$ (mL/g) |
|---|---|---|---|---|
| 8.28 [b] | 0.09 | 98.91 | 8.2 | 9.1 × 10$^4$ |
| 51.0 [c] | 0.09 | 99.80 | 50.9 | 5.7 × 10$^5$ |
| 109 [d] | 0.03 | 99.97 | 109.0 | 3.6 × 10$^6$ |
| 201 [e] | 0.004 | 99.99 | 201.0 | 5.0 × 10$^7$ |
| 383 [f] | 37.7 | 90.16 | 345.3 | 9.2 × 10$^3$ |
| 579 [g] | 164 | 71.68 | 415.0 | 2.5 × 10$^3$ |
| 782 [h] | 319 | 59.21 | 463.0 | 1.5 × 10$^3$ |
| 1167 [i] | 687 | 41.13 | 480.0 | 28.3 |

[a] m = 0.02 g, V = 20 mL, V/m = 1000 mL/g; Contact time: 24 h.
pH values:
[b] 5.64 → 3.79,
[c] 5.12 → 3.27,
[d] 4.63 → 3.02,
[e] 4.45 → 2.81,
[f] 4.90 → 2.75,
[g] 4.45 → 2.48,
[h] 4.65 → 2.34,
[i] 4.71 → 2.57.

TABLE 5

Adsorption capacities of various adsorbents for heavy metal ions.

| | adsorbents | q$_m$ (mg/g) | References |
|---|---|---|---|
| Cu$^{2+}$ | MoS$_4$-Ppy | 111 | this work |
| | E. crassipes[a] | 11.6/27.7 | Komy, Z. R., et al., J. King Saud. Univ. -Sci., 2013, 25 (1), 47-56. |
| | EDTA-silica[b] | 79 | Kumar, R., et al., J. Colloid Interf. Sci. 2013, 408, 200-205. |
| | MMT[c] | 4.4 | Ijagbemi, C. O., et al., J. Hazard. Mater. 2009, 166 (1), 538-546. |
| | PEI-modified biomass[d] | 92 | Deng, S., et al., Water Res. 2005, 39 (10), 2167-2177. |
| | Cell 2, 4[e] | 56.8/69.4 | Gurgel, L. V. A., et al., Carbohydr. Polym. 2009, 77 (1), 142-149. |
| | MS[f] | 62.9 | Lim, S. F., et al., Environ. Sci. Technol. 2008, 42 (7), 2551-2556. |
| Ag$^+$ | MoS$_4$-Ppy | 480 (pH~5)/725 (pH~1) | this work |
| | APAN nanofiber mats[g] | 155 | Kampalanonwat, P., et al., ACS Appl. Mater. Interfaces 2010, 2 (12), 3619-3627 |
| | Fe$_3$O$_4$@EDTA[h] | 112 | Ghasemi, E., et al., Microchem. J. 2017, 131, 51-56 |
| | Fe$_3$O$_4$-decorated MEG-NH$_2$[i] | 100 | Ma, Y. X., et al., J. Nanomater. 2017, 2017, 1-11. |
| | Nano-TiO$_2$-MBI[j] | 128 | Pourreza, N., et al., J. Ind. Eng. Chem. 2014, 20 (1), 127-132. |

TABLE 5-continued

Adsorption capacities of various adsorbents for heavy metal ions.

|  | adsorbents | $q_m$ (mg/g) | References |
|---|---|---|---|
|  | Cercis siliquastrum tree leave[k] | 94 | Zolgharnein, J., et al., Clean: Soil, Air, Water 2013, 41 (12), 1183-1195 |
|  | MCX[l] | 166 | Beyki, M. H., et al., Ind. Eng. Chem. Res. 2014, 53 (39), 14904-14912. |
|  | $S_x$-LDH[m] | 383 | Ma, S. L., et al., J. Mater. Chem. A 2014, 2 (26), 10280-10289. |
|  | KMS-2[n] | 408 | Hassanzadeh Fard, Z., et al., Chem. Mater. 2015, 27(6), 1925-1928. |
|  | $MoS_4$-LDH[o] | 450 | Ma, L. J., et al., J. Am. Chem. Soc. 2016, 138 (8), 2858-2866. |
| $Pb^{2+}$ | $MoS_4$-Ppy | 78 | this work |
|  | Cl-LDH[p] | 40 | Liang, X., et al., Colloids Surf., A 2010, 366 (1-3), 50-57. |
|  | $Fe_3O_4$-GS[q] | 28 | Guo, X., et al., Hazard. Mater. 2014, 278, 211-220 |
|  | Ethylenediamine-modified MWCNT[r] | 54 | Zang, Z. P., et al., J. Hazard. Mater. 2009, 172, 958-963. |
|  | APAN nanofiber mats | 60 | Kampalanonwat, P., et al., ACS Appl. Mater. Interfaces 2010, 2 (12), 3619-3627. |
|  | CDpoly-MNPs[s] | 64 | Badruddoza, A. Z. M., et al., Carbohydr. Polym. 2013, 91 (1), 322-332. |
|  | XMCS[t] | 77 | Zhu, Y. H., et al., J. Hazard. Mater. 2012, 221, 155-161 |
| $Hg^{2+}$ | $MoS_4$-Ppy | 210 | this work |
|  | $Fe_3O_4$-GS | 23 | Guo, X., et al., J. Hazard. Mater. 2014, 278, 211-220. |
|  | $Fe_3O_4$@EDTA | 112 | Ghasemi, E., et al., Microchem. J. 2017, 131, 51-56. |
|  | SH-$Fe_3O_4$-NMPs[u] | 132 | Pan, S., et al., J. Colloid Interface Sci. 2012, 365 (1), 204-212. |
|  | Carbon A, B, C[v] | 174/154/134 | Budinova, T., et al., Ind. Eng. Chem. Res. 2003, 42 (10), 2223-2229. |
|  | M-ATP[w] | 90 | Cui, H., et al., Appl. Clay Sci. 2013, 72, 84-90. |
|  | SWCNT-SH[x] | 131 | Bandaru, N. M., et al., J. Hazard. Mater. 2013, 261, 534-541 |
|  | SG-TEOS (-BTESPT and -MPTMS)[y] | 41/93/102 | Johari, K., et al., Mat, H. Can. J. Chem. Eng. 2014, 92 (6), 1048-1058. |

[a]Eichhornia crassipes (E. crassipes).
[b]Ethylenediaminetetraacetic acid (EDTA) functionalized silica (EDTA-silica).
[c]Montmorillonite (MMT).
[d]Polyethylenimine (PEI) modified with biomass of penicillium chrysogenum (PEI-modified biomass).
[e]Succinylated mercerized cellulose modified with triethylenetetramine (Cell 2, 4).
[f]Calcium alginate encapsulated magnetic sorbent (MS).
[g]Aminated electrospun polyacrylonitrile nanofiber mats (APAN nanofiber mats).
[h]EDTA functionalized $Fe_3O_4$ nanoparticles ($Fe_3O_4$@EDTA).
[i]Amino functionalized magnetic expanded graphite nanohybrids ($Fe_3O_4$-decorated MEG-$NH_2$).
[j]Nano-$TiO_2$ modified with 2-mercaptobenzimidazole (Nano-$TiO_2$-MBI).
[k]Cercis siliquastrum tree leaves.
[l]Magnetic cellulose xanthate (MCX).
[m]MgAl layered double hydroxide intercalated by polysulfide $S_x^{2-}$ (MgAl-$S_x$-LDH).
[n]Layered metal sulfides of $K_{2x}Mg_xSn_{3-x}S_6$ (KMS-2).
[o]MgAl layered double hydroxide intercalated with the $MoS_4^{2-}$ ion (MgAl—$MoS_4$-LDH).
[p]Layered double hydroxide intercalated by chloride (Cl-LDH).
[q]Graphene sheet composited with ferroferric oxide ($Fe_3O_4$-GS).
[r]Ethylenediamine-modified multiwalled carbon nanotubes (MWCNT).
[s]Carboxymethyl-cyclodextrin polymer modified $Fe_3O_4$ nanoparticles (CDpoly-MNPs).
[t]Xanthate-modified magnetic chitosan (XMCS).
[u]Mercapto-functionalized nano-$Fe_3O_4$ magnetic polymers (SH-$Fe_3O_4$-NMPs).
[v]Steam-activated furfural carbon (carbon A), steam-activated carbon from a mixture of furfural and tar from apricot stones (carbon B), air-oxidized furfural carbon (carbon C).
[w]Natural attapulgite (ATP) modified with an amino-terminated organosilicon (3-aminopropyltriethoxysilane, APTES) (M-ATP).
[x]Thiol-derivatized single walled carbon nanotube (SWCNT-SH) powders.
[y]Silica gel synthesised with tetraethyl orthosilicate (TEOS) as a precursor (SG-TEOS), sulfur-functionalized silica gel using TEOS as a precursor with bis(triethoxysilylpropyl)tetrasulfide (BTESPT) (SG-BTESPT), and silica gel synthesized with TEOS as a precursor and 3-mercaptopropyl trimethoxysilane (MPTMS) as sulfur ligands (SG-MPTMS).

TABLE 12

Sorption data of MoS$_4$-Ppy towards Cu$^{2+}$.[a]

| $C_0$ (ppm) | $C_f$ (ppm) | Removal (%) | $q_m$ (mg/g) | $K_d$ (mL/g) |
|---|---|---|---|---|
| 8.75 [b] | 0.16 | 98.17 | 8.6 | 5.4 × 10$^4$ |
| 53.3 [c] | 30.5 | 42.78 | 22.8 | 7.5 × 10$^2$ |
| 111 [d] | 71.6 | 35.50 | 39.4 | 5.5 × 10$^2$ |
| 197 [e] | 150.0 | 23.86 | 47.0 | 3.1 × 10$^2$ |
| 401 [f] | 344.0 | 11.97 | 57.0 | 1.7 × 10$^2$ |
| 608 [g] | 537.0 | 9.38 | 71.0 | 1.3 × 10$^2$ |
| 824 [h] | 737.0 | 7.40 | 87.0 | 1.2 × 10$^2$ |
| 1218 [i] | 1107.0 | 6.16 | 111.0 | 1.0 × 10$^2$ |

[a] m = 0.02 g, V = 20 mL, V/m = 1000 mL/g; contact time: 24 h.
pH value:
[b] 5.32 → 3.66,
[c] 5.19 → 3.32,
[d] 4.76 → 3.00,
[e] 4.76 → 2.88,
[f] 4.81 → 3.02,
[g] 4.76 → 3.14,
[h] 4.58 → 2.71,
[i] 4.43 → 2.82.

TABLE 13

Sorption data of MoS$_4$-Ppy towards Pb$^{2+}$.[a]

| $C_0$ (ppm) | $C_f$ (ppm) | Removal (%) | $q_m$ (mg/g) | $K_d$ (mL/g) |
|---|---|---|---|---|
| 10.2 [b] | 0.001 | 99.96 | 10.2 | 2.6 × 10$^6$ |
| 67.5 [c] | 14.5 | 78.52 | 53.0 | 3.7 × 10$^3$ |
| 171 [d] | 108.0 | 36.84 | 63.0 | 5.8 × 10$^2$ |
| 376 [e] | 311.0 | 17.29 | 65.0 | 2.1 × 10$^2$ |
| 629 [f] | 557.0 | 11.45 | 72.0 | 1.3 × 10$^2$ |
| 821 [g] | 743.0 | 9.50 | 78.0 | 1.1 × 10$^2$ |

[a] m = 0.02 g, V = 20 mL, V/m = 1000 mL/g; contact time: 24 h.
pH value:
[b] 5.51 → 3.84,
[c] 5.24 → 3.65,
[d] 4.42 → 3.29,
[e] 5.07 → 3.14,
[f] 4.41 → 3.52,
[g] 4.45 → 3.62.

TABLE 14

Sorption data of MoS$_4$-Ppy towards Hg$^{2+}$. [a]

| $C_0$ (ppm) | $C_f$ (ppm) | Removal (%) | $q_m$ (mg/g) | $K_d$ (mL/g) |
|---|---|---|---|---|
| 14.79 [b] | 0.001 | 99.99 | 14.8 | 1.5 × 10$^7$ |
| 48.5 [c] | 0.001 | 99.99 | 48.5 | 4.9 × 10$^7$ |
| 105 [d] | 0.001 | 99.99 | 105.0 | 1.1 × 10$^8$ |
| 170 [e] | 0.004 | 99.99 | 167.0 | 4.3 × 10$^7$ |
| 211 [f] | 0.33 | 99.84 | 210.6 | 6.4 × 10$^5$ |

[a] m = 0.02 g, V = 20 mL, V/m = 1000 mL/g; contact time: 24 h.
pH value:
[b] 2.03→1.99,
[c] 1.84→1.76,
[d] 2.06→2.10,
[e] 2.80→2.90,
[f] 2.22→2.07.

The chemical formula of as-prepared MoS$_4$-Ppy is (C$_4$H$_3$N) (MoS$_4$)$_{0.12}$ (NO$_3$)$_{0.01}$·2.8H$_2$O (molecular weight~142.9), which means 1 g of MoS$_4$-Ppy has 8.4×10$^{-4}$ (=1/142.9×0.12) mol of MoS$_4^{2-}$. If the MoS$_4^{2-}$ binds to Ag$^+$ in a ratio of 1:2, according to Eq. (1):

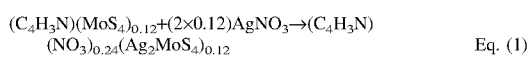

then the calculated $q_m^{Ag}$ value for adsorbed Ag$^+$ amount is 181 mg/g (=(8.4×10$^{-4}$)×2×108×1000).

Alternatively, if the MoS$_4^{2-}$ anions reacted with Ag$^+$ to form Ag$_2$S according to Eq. (2), then the calculated $q_m^{Ag}$ value for Ag$^+$ is 725 mg/g (=(8.4×10$^{-4}$)×8×108×1000).

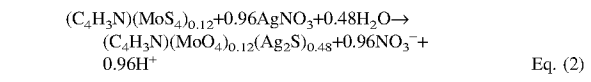

The observed experimental $q_m^{Ag}$ value of 480 mg/g is between the two cases, suggesting that MoS$_4$-Ppy traps Ag$^+$ ion by means of both binding modes as indicated by Eq. (1) and Eq. (2).

Figure 10A:
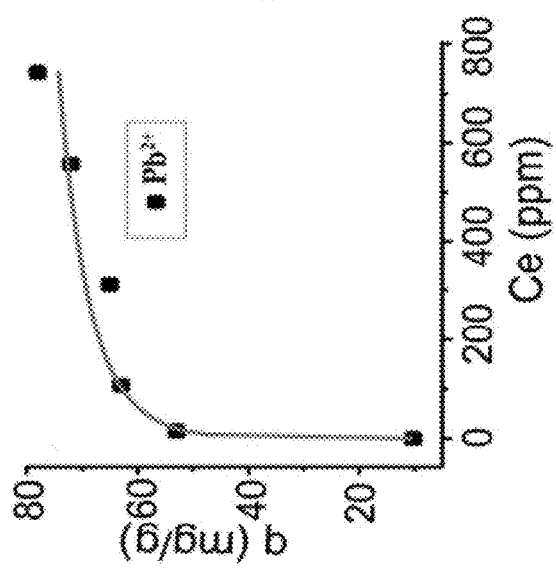
FIGS. 10A and 10B. Sorption isotherms for sorption of (FIG. 10A) Pb$^{2+}$ and (FIG. 10B) Hg$^{2+}$ by MoS$_4$-Ppy. Langmuir equilibrium isotherms were derived from equilibrium concentration (C$_e$, ppm), plotted against the adsorption capacity (q, mg/g).
Figure 10B:
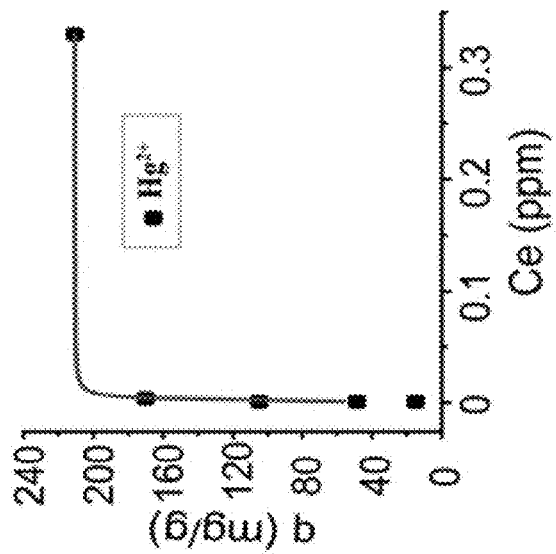

Langmuir isotherm curves are generally used to present experimental data of uptake capacity. The Langmuir isotherm model is defined as:

$$q = q_m \frac{bCe}{1+bCe} \quad \text{Eq. (3)}$$

where q (mg/g) is the equilibrium adsorption capacity, $C_e$ (mg/L) is the ion concentration at equilibrium, $q_m$ (mg/g) is the theoretical maximum sorption capacity. In this model, the adsorbed substance is supposed to achieve monolayer type coverage of the sorbent on an adsorbent surface and indicates that there is a one-to-one correspondence between the sorption capacity and the adsorption site. The equilibrium adsorption isotherms of Pb$^{2+}$ and Hg$^{2+}$ are shown in FIGS. 10A and 10B. For Pb$^{2+}$ (FIG. 10A), the data points were well-fitted with the Langmuir model with a correlation coefficient (R$^2$) of ~0.98 (Table 15), suggesting a monolayer adsorption (R$^2$>0.97) on the MoS$_4$-Ppy. A $q_m^{Pb}$ of 111.6 mg/g was determined by the Langmuir isotherm model. Based on the 1:1 MoS$_4^{2-}$:Pb$^{2+}$ coordination, the calculated $q_m^{Pb}$ was 174 mg/g (=(8.4×10$^{-4}$)×1×207·1000). The fitted experimental $q_m^{Pb}$ of 111.6 mg/g was lower than the calculated $q_m^{Pb}$ (174 mg/g), meaning a different binding mode of Pb$^{2+}$.

TABLE 15

Fitting results from Langmuir isotherm model.

| Ions | $q_m$ (mg/g) | b (L/mg) | R$^2$ |
|---|---|---|---|
| Pb$^{2+}$ | 111.6 | 0.4755 | 0.98 |
| Hg$^{2+}$ | 210.7 | 7.0 × 10$^4$ | 0.69 |
| Ag$^+$ (pH~1) | 666 | 5.8 × 10$^{-5}$ | 0.98 |

For Hg$^{2+}$ (FIG. 10B), the expected $q_m^{Hg}$ of 210.7 mg/g was also obtained from its Langmuir isotherm model, which was fitted quite well with the experimental value of 210.6 mg/g (Table 14). From 1:1 MoS$_4^{2-}$:Hg$^{2+}$ binding (Eq. (4), shown below), the calculated $q_m^{Hg}$ was 168.5 mg/g (=(8.4×10$^{-4}$)×1×200.6·1000). The larger experimental $q_m^{Hg}$ of 210.6 mg/g illustrates that Hg$^{2+}$ may combine with MoS$_4^{2-}$ to form HgS (1:4 mode, i.e., 1 MoS$_4^{2-}$ binds to 4 Hg$^{2+}$) according to Eq. (5).

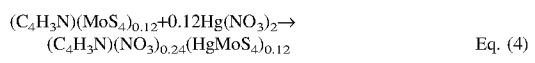

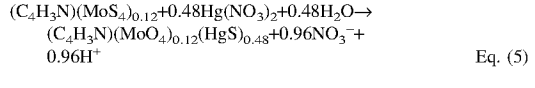

TABLE 14

Sorption data of MoS$_4$-Ppy towards Hg$^{2+}$.[a]

| C$_0$ (ppm) | C$_f$ (ppm) | Removal (%) | q$_m$ (mg/g) | K$_d$ (mL/g) |
|---|---|---|---|---|
| 14.79 [b] | 0.001 | 99.99 | 14.8 | 1.5 × 10$^7$ |
| 48.5 [c] | 0.001 | 99.99 | 48.5 | 4.9 × 10$^7$ |
| 105 [d] | 0.001 | 99.99 | 105.0 | 1.1 × 10$^8$ |
| 170 [e] | 0.004 | 99.99 | 167.0 | 4.3 × 10$^7$ |
| 211 [f] | 0.33 | 99.84 | 210.6 | 6.4 × 10$^5$ |

[a] m = 0.02 g, V = 20 mL, V/m = 1000 mL/g; contact time: 24 h.
pH value: [b] 2.03 → 1.99, [c] 1.84 → 1.76, [d] 2.06 → 2.10, [e] 2.80 → 2.90, [f] 2.22 → 2.07.

Adsorption kinetics. The adsorption kinetics of Ag$^+$, Pb$^{2+}$, and Hg$^{2+}$ by MoS$_4$-Ppy were investigated to assess the adsorption efficiency and explore the possible pathways of adsorption before equilibrium. The results (Table 6, Table 16, Table 17) and sorption kinetics curves (FIG. 2A-2D) show rapid uptake rates and high removal efficiency. For toxic Pb$^{2+}$ (initial pH value of 4.7), the absorption was extremely rapid, with >99.7% removal rates, and K$_d^{Pb}$>10$^5$ mg/L only within 5 min and even >10$^7$ mg/L eventually. The % removal for Hg$^{2+}$ (initial pH value of 2.1) can reach >98% within 30 min, and K$_d$ values were >10$^4$ mg/L within 1 h and up to >10$^6$ mg/L during the further contact time.

TABLE 6

Kinetics data of Pb$^{2+}$ using MoS$_4$-Ppy.[a]

| C$_0$ (ppm) | time (min) | C$_f$ (ppm) | Removal (%) | K$_d$ (mL/g) |
|---|---|---|---|---|
| 10.46 | 1 | 0.007 | 99.93 | 1.5 × 10$^6$ |
| | 5 | 0.017 | 99.83 | 6.1 × 10$^5$ |
| | 10 | 0.011 | 99.89 | 9.5 × 10$^5$ |
| | 60 | 0.007 | 99.93 | 1.5 × 10$^6$ |
| | 180 | 0.031 | 99.70 | 3.6 × 10$^6$ |
| | 360 | 0.001 | 99.99 | 1.1 × 10$^7$ |

[a] m = 0.04 g, V = 40 mL, V/m = 1000 mL/g;
pH value: 4.74 → 4.47.

TABLE 16

Kinetics data of Ag using MoS4-Ppy.[a]

| C$_0$ (ppm) | time (min) | C$_f$ (ppm) | Removal (%) | K$_d$ (mL/g) |
|---|---|---|---|---|
| 11.0 | 1 | 0.040 | 99.6 | 2.7 × 10$^5$ |
| | 5 | 0.030 | 99.7 | 3.7 × 10$^5$ |
| | 10 | 0.030 | 99.7 | 3.7 × 10$^5$ |
| | 30 | 0.030 | 99.7 | 3.7 × 10$^5$ |
| | 60 | 0.040 | 99.6 | 2.7 × 10$^5$ |

[a] m = 0.04 g, V = 40 mL, V/m = 1000 mL/g;
pH value: 4.57 → 3.87.

TABLE 17

Kinetics data of Hg$^{2+}$ using MoS$_4$-Ppy.[a]

| C$_0$ (ppm) | time (min) | C$_f$ (ppm) | Removal (%) | K$_d$ (mL/g) | q$_t$ (mg/g) |
|---|---|---|---|---|---|
| 11.2 | 1 | 0.190 | 98.30 | 5.8 × 10$^4$ | 11.01 |
| | 30 | 0.169 | 98.49 | 6.5 × 10$^4$ | 11.03 |
| | 60 | 0.138 | 98.77 | 8.0 × 10$^4$ | 11.06 |
| | 180 | 0.006 | 99.95 | 1.9 × 10$^6$ | 11.19 |
| | 360 | 0.002 | 99.98 | 5.6 × 10$^6$ | 11.20 |

[a] m = 0.04 g, V = 40 mL, V/m = 1000 mL/g;
pH value: 2.07 → 2.35.

The removal rate can be determined in two different ways: pseudo-first-order and pseudo-second-order mechanisms, which were defined as follows:

Pseudo-first-order:

$$\ln(q_e - q_{yt}) = \ln q_e - k_1 t \qquad \text{Eq. (6)}$$

Pseudo-second-order:

$$\frac{1}{q_t} = \frac{1}{k_2 q_e^2} + \frac{t}{q_e} \qquad \text{Eq. (7)}$$

where q$_e$ (mg/g) is the adsorbed amount per unit mass of adsorbent at equilibrium and q$_t$ (mg/g) is the adsorbed mass at time t, while k$_1$ (min$^{-1}$) and k$_2$ (g/mg min$^{-1}$) are corresponding equilibrium rate constants. (See, Azizian, S. *J. Colloid Interface Sci.* 2004, 276 (1), 47-52.) The k$_1$ value was obtained by plotting ln(q$_e$-q$_t$) against t and the k$_2$ by plotting t/q$_t$ against t. The linear relationship of t/q$_t$ versus t is presented in FIG. 2D. From the kinetic parameters of Ag$^+$, Pb$^{2+}$, and Hg$^{2+}$ (Table 18), the calculated sorption capacities (q$_{e,cal}$) derived from the pseudo-second-order model were quite close to corresponding experimental values (q$_{e,exp}$). The fit coefficient (R$^2$) was close to 1, indicating the adsorption was well fitted with the pseudo-second-order kinetic model, suggesting a chemisorption process.

TABLE 18

Kinetics parameters (pseudo-second-order-model) for adsorbing metal ions onto MoS$_4$-Ppy.

| | q$_{e, exp}$ | k$_2$ | q$_{e, cal}$ (mg/g) | R$^2$ |
|---|---|---|---|---|
| Ag$^+$ | 10.97 | 8.28 × 10$^{-3}$ | 10.99 | 0.999 |
| Pb$^{2+}$ | 10.45 | 1.77 | 10.45 | 1 |
| Hg$^{2+}$ | 11.19 | 0.309 | 11.21 | 0.999 |

Uptake capacity for Ag$^+$ in strong acid (SA) conditions (pH~1). As discussed above, the capture ability of MoS$_4$-Ppy for Ag$^+$ was markedly enhanced in the ionic mixture (pH=3.4) compared to the individual ion case (pH=5.1). This prompted the study of the uptake capacity for Ag$^+$ in strong acid (SA) condition. As shown in Table 7, at pH≈1, an exceptionally high q$_m^{SA-Ag}$ of 725 mg/g was obtained (with initial concentrations of 10-2000 ppm), being ~1.5 times (=725/480) of the q$_m^{Ag}$ of 480 mg/g in the weak acid case. This clearly indicates the enhanced effect at lower pH. The experimental data of uptake capacity for Ag$^+$ were fitted well with the Langmuir isotherm model of Eq. (3). See FIGS. 3A and 3B, with correlation coefficient (R$^2$) of 0.98. According to the Langmuir isotherm model, the expected capacity q$_m^{SA-Ag}$ of 666 mg/g is close to the experimental value of 725 mg/g. The much larger value of 725 mg/g corresponds to the value based on Eq. (2), which suggests that in strongly acidic conditions, one $MoS_4^{2-}$ binds to 8 $Ag^+$ ions, forming $4Ag_2S$. In this case, the $MoO_4^{2-}$ may act as the counter-anion to balance the charge in the Ppy backbone. Mo was not detected in the filtrates after sorption, which indicates that the Mo remained in the solids.

TABLE 7

Sorption data of $MoS_4$-Ppy towards $Ag^+$ at strong acidic conditions.[a]

| $C_0$ (ppm) | $C_f$ (ppm) | Removal (%) | $q_m$ (mg/g) | $K_d$ (mL/g) |
|---|---|---|---|---|
| 9.96 [b] | 0.01 | 99.90 | 9.9 | $1.0 \times 10^6$ |
| 47.3 [c] | 2.95 | 93.76 | 44.4 | $1.5 \times 10^4$ |
| 198 [d] | 17.4 | 91.21 | 180.6 | $1.0 \times 10^4$ |
| 485 [e] | 30.6 | 93.69 | 454.4 | $1.5 \times 10^4$ |
| 981 [f] | 329 | 66.46 | 652.0 | $2.0 \times 10^3$ |
| 1439 [g] | 820 | 43.02 | 619.0 | $7.5 \times 10^2$ |
| 1902 [h] | 1177 | 38.12 | 725.0 | $6.2 \times 10^2$ |

[a] m = 0.02 g, V = 20 mL, V/m = 1000 mL/g; contact time: 24 h.
pH value: [b] 0.91 → 1.03, [c] 0.82 → 0.88, [d] 0.68 → 0.77, [e] 0.63 → 0.78, [f] 0.67 → 0.82, [g] 0.60 → 0.75, [h] 0.80 → 0.80.

Adsorption kinetics of $Ag^+$, $Pb^{2+}$ and $Hg^{2+}$ in strong acid (SA) conditions (pH~1). The kinetic behavior for $Ag^+$, $Pb^{2+}$, and $Hg^{2+}$ was subsequently investigated in strongly acidic conditions in order to further understand the pH effect on the adsorption. For $Ag^+$ (Table 8), >99.9% removal and $K_d > 10^6$ mg/L within 5 min were observed, exhibiting a more efficient capture than under weak acid conditions (Table 16). For the highly toxic $Hg^{2+}$ (Table 9), the concentration decreased from 10 ppm to 8 ppb within 5 min, and then even lower than the officially set safety level of 2 ppb. Therefore, $MoS_4$-Ppy exhibited better $Hg^{2+}$ removal in strongly acidic conditions than in weakly acidic ones. Interestingly, the $MoS_4$-Ppy exhibited nearly no adsorption for $Pb^{2+}$ (Table 19) under strong acid conditions (pH≈1), and this could be used to separate $Pb^{2+}$ from other heavy metal ions. The kinetics curves for $Ag^+$ and $Hg^{2+}$ (FIG. 4A-4D) and kinetic parameters (Table 20) clearly demonstrate the rapid removal of $Ag^+$ than $Hg^{2+}$ in strongly acidic conditions.

TABLE 8

Kinetics data of $Ag^+$ using $MoS_4$-Ppy under strong acid conditions.[a,b]

| $C_0$ (ppm) | time (min) | $C_f$ (ppm) | Removal (%) | $K_d$ (mL/g) |
|---|---|---|---|---|
| 17.0 | 1 | 0.064 | 99.62 | $2.6 \times 10^5$ |
|  | 5 | 0.013 | 99.92 | $1.3 \times 10^6$ |
|  | 10 | 0.008 | 99.95 | $2.1 \times 10^6$ |
|  | 30 | 0.001 | 99.99 | $1.7 \times 10^7$ |
|  | 60 | 0.001 | 99.99 | $1.7 \times 10^7$ |
|  | 360 | 0.001 | 99.99 | $1.7 \times 10^7$ |

[a] m = 0.04 g, V = 40 mL, V/m = 1000 mL/g;
pH value: [b] 0.83 → 1.18.

TABLE 9

Kinetics data of $Hg^{2+}$ using $MoS_4$-Ppy under strong acid conditions.[a]

| $C_0$ (ppm) | time (min) | $C_f$ (ppm) | Removal (%) | $K_d$ (mL/g) |
|---|---|---|---|---|
| 11.2 | 1 | 0.039 | 99.65 | $2.86 \times 10^5$ |
|  | 5 | 0.008 | 99.93 | $1.40 \times 10^6$ |
|  | 30 | 0.005 | 99.96 | $2.24 \times 10^6$ |

TABLE 9-continued

Kinetics data of $Hg^{2+}$ using $MoS_4$-Ppy under strong acid conditions.[a]

| $C_0$ (ppm) | time (min) | $C_f$ (ppm) | Removal (%) | $K_d$ (mL/g) |
|---|---|---|---|---|
|  | 60 | 0.005 | 99.96 | $2.24 \times 10^6$ |
|  | 180 | 0.002 | 99.98 | $5.60 \times 10^6$ |
|  | 360 | 0.001 | 99.99 | $1.12 \times 10^7$ |

[a] m = 0.04 g, V = 40 mL, V/m = 1000 mL/g;
pH value: 0.93 → 1.25.

TABLE 16

Kinetics data of $Ag^+$ using $MoS_4$-Ppy.[a]

| $C_0$ (ppm) | time (min) | $C_f$ (ppm) | Removal (%) | $K_d$ (mL/g) |
|---|---|---|---|---|
| 11.0 | 1 | 0.040 | 99.6 | $2.7 \times 10^5$ |
|  | 5 | 0.030 | 99.7 | $3.7 \times 10^5$ |
|  | 10 | 0.030 | 99.7 | $3.7 \times 10^5$ |
|  | 30 | 0.030 | 99.7 | $3.7 \times 10^5$ |
|  | 60 | 0.040 | 99.6 | $2.7 \times 10^5$ |

[a] m = 0.04 g, V = 40 mL, V/m = 1000 mL/g;
pH value: 4.57 → 3.87.

TABLE 19

Kinetics data of $Pb^{2+}$ using $MoS_4$-Ppy under strong acid conditions.[a]

| $C_0$ (ppm) | time (min) | $C_f$ (ppm) | Removal (%) | $K_d$ (mL/g) | $q_t$ (mg/g) |
|---|---|---|---|---|---|
| 11.7 | 1 | 11.0 | 5.98 | 63.6 | 0.7 |
|  | 5 | 11.0 | 5.98 | 63.6 | 0.7 |
|  | 10 | 11.2 | 4.27 | 44.6 | 0.5 |
|  | 30 | 11.2 | 4.27 | 44.6 | 0.5 |
|  | 60 | 11.3 | 3.42 | 35.4 | 0.4 |
|  | 180 | 11.2 | 4.27 | 44.6 | 0.5 |
|  | 360 | 11.3 | 3.42 | 35.40 | 0.4 |

[a] m = 0.04 g, V = 40 mL, V/m = 1000 mL/g;
pH value: 0.83 → 1.18.

TABLE 20

Kinetics parameters (pseudo-second-order-model) for adsorbing metal ions onto $MoS_4$-Ppy under strong acid condition.

|  | $q_{e, exp}$ | $k_2$ | $q_{e, cal}$ (mg/g) | $R^2$ |
|---|---|---|---|---|
| $Ag^+$ | 16.99 | 21.63 | 17.00 | 1 |
| $Hg^{2+}$ | 11.19 | 8.39 | 11.20 | 1 |

Relative selectivity towards $Pb^{2+}$, $Ag^+$ and $Hg^{2+}$ in strongly acidic conditions. Selectivity experiments towards $Ag^+$, $Pb^{2+}$, and $Hg^{2+}$ were conducted under strong acid conditions (pH<1), using a solution of $Ag^+$, $Pb^{2+}$, and $Hg^{2+}$ mixture with an initial concentration of ~20 ppm for each ion. The quantities of solid $MoS_4$-Ppy used were 0.002 g and 0.004 g. As shown in Table 21, in the case of the reduced amount of $MoS_4$-Ppy (0.002 g), there was nearly no adsorption for $Pb^{2+}$. For $Ag^+$ and $Hg^{2+}$, the separation factor ($SF_{Ag/Hg}$) defined by $K_d^{Ag}/K_d^{Hg}$ was further studied. When the amount of $MoS_4$-Ppy was decreased to 0.004 g (⅕ of 0.02 g) and then to 0.002 g (1/10 of 0.02 g), the $SF_{Ag/Hg}$ values were 2.8 (=$(7.4\times10^3)/(2.6\times10^2)$) and 2.4 (=$(5.6\times10^3)/(2.36\times10^2)$), respectively, showing a somewhat higher affinity for $Ag^+$ than for $Hg^{2+}$. All these results show the $MoS_4$-Ppy can work as an effective material for separating $Pb^{2+}$ from mixtures of $Pb^{2+}/Ag^+/Hg^{2+}$ in strongly acidic conditions.

TABLE 21

Adsorption results of MoS$_4$-Ppy for Pb$^{2+}$, Ag$^+$ and Hg$^{2+}$ under strong acid condition.[a]

| MoS$_4$-Ppy | 0.002 g | | | 0.004 g | | |
|---|---|---|---|---|---|---|
| | Ag$^+$ | Pb$^{2+}$ | Hg$^{2+}$ | Ag$^+$ | Pb$^{2+}$ | Hg$^{2+}$ |
| C$_0$ (ppm) | 24.7 | 21.3 | 28.4 | 24.7 | 21.3 | 28.4 |
| C$_f$ (ppm)-6 h | 15.8 | 21.3 | 23.0 | 10.0 | 21.3 | 18.6 |
| K$_d$ (mL/g)-6 h | 5.6 × 10$^3$ | 0 | 2.3 × 10$^3$ | 7.4 × 10$^3$ | 0 | 2.6 × 10$^3$ |
| Removal (%) | 36.0 | 0 | 19.0 | 59.5 | 0 | 35.5 |
| pH | 0.85 → 0.90 | | | 0.85 → 0.93 | | |

Figure 5:
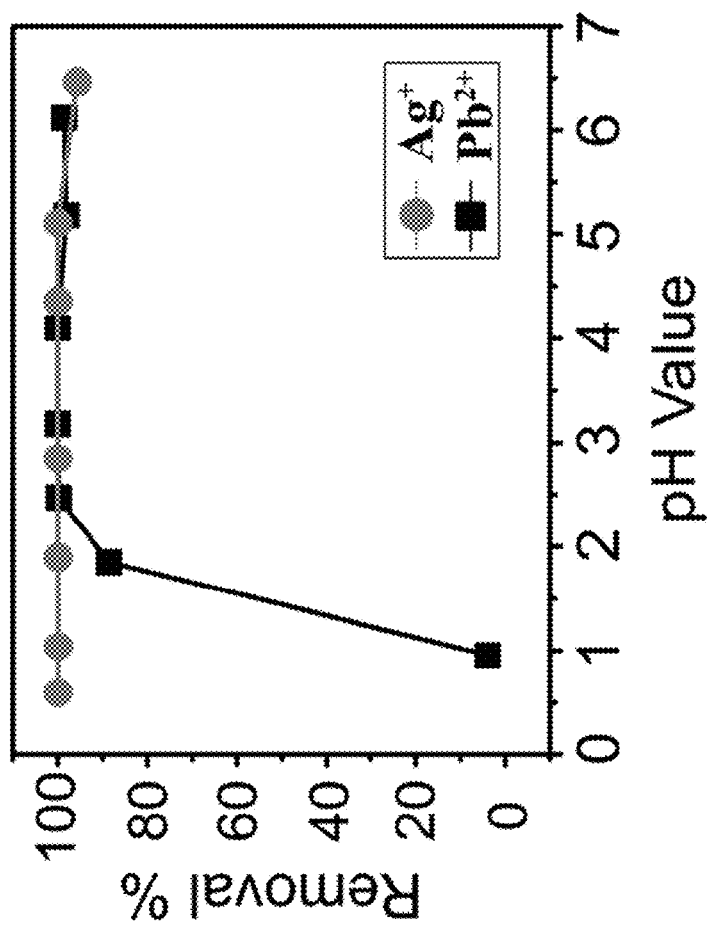
FIG. 5. pH effect on the removal rates of $Ag^+$ and $Pb^{2+}$ by $MoS_4$-Ppy.

[a] 20 ml solution of AgNO$_3$, Pb(NO$_3$)$_2$ and Hg(NO$_3$)$_2$, 20 ppm concentration per ion.

pH effect on removal of Ag$^+$ and Pb$^{2+}$ by MoS$_4$-Ppy. Based on the sensitive pH effect discussed above on the adsorption of Ag$^+$ and Pb$^{2+}$, pH ranges favorable for trapping Pb$^{2+}$ and Ag$^+$ were investigated by varying the pH. As shown in Table 22, Ag$^+$ maintained >99.9% removal rates and >10$^6$ mg/L of K$_d$ within a wide pH range of 0.6~4.36, demonstrating the outstanding capacity for Ag$^+$ removal at a broad pH range. For Pb$^{2+}$ (Table 23), the adsorption at the initial pH~0.9 was poor, in good agreement with the results of Pb$^{2+}$ removal in strong acid conditions (Table 19). However, >98% removal rates and K$_d^{Pb}$>10$^4$ mg/L could be obtained at pH=2.5~6, suggesting different uptakes towards Pb$^{2+}$ in different conditions. The best pH value for Pb$^{2+}$ removal was determined to be ~3, giving nearly complete removal (100%) and the highest K$_d$ (>2.6×10$^7$ mg/L). The pH effect on the two ions is shown in FIG. 5.

TABLE 22 pH effect on sorption data of MoS$_4$-Ppy towards Ag$^+$.[a]

| pH | C$_0$ (ppm) | C$_f$ (ppm) | Removal (%) | q$_m$ (mg/g) | K$_d$ (mL/g) |
|---|---|---|---|---|---|
| 0.60 → 0.72 | 17.0 | 0.001 | 99.99 | 16.9 | 1.7 × 10$^7$ |
| 1.90 → 2.03 | 18.9 | 0.004 | 99.98 | 18.9 | 4.7 × 10$^6$ |
| 2.85 → 3.23 | 20.8 | 0.01 | 99.95 | 20.8 | 2.1 × 10$^6$ |
| 4.36 → 3.88 | 20.5 | 0.01 | 99.95 | 20.5 | 2.0 × 10$^6$ |
| 6.47 → 3.73 | 15.6 | 0.69 | 95.66 | 15.2 | 2.2 × 10$^4$ |

[a] m = 0.02 g, V = 20 mL, V/m = 1000 mL/g;
contact time: 24 h.

TABLE 23 pH effect on sorption data of MoS$_4$-Ppy towards Pb$^{2+}$.[a]

| pH | C$_0$ (ppm) | C$_f$ (ppm) | Removal (%) | q$_m$ (mg/g) | K$_d$ (mL/g) |
|---|---|---|---|---|---|
| 0.96 → 0.93 | 22.5 | 21.6 | 4.00 | 0.9 | 41.7 |
| 1.85 → 1.78 | 24.0 | 2.75 | 88.54 | 21.3 | 7.7 × 10$^3$ |
| 2.47 → 2.47 | 25.4 | 0.06 | 99.76 | 25.3 | 4.2 × 10$^5$ |
| 3.18 → 3.25 | 26.3 | <0.001 | 100.0 | 26.3 | >2.6 × 10$^7$ |
| 4.10 → 3.85 | 21.9 | 0.04 | 99.98 | 21.9 | 5.5 × 10$^5$ |
| 6.12 → 3.58 | 21.8 | 0.31 | 98.58 | 21.5 | 6.9 × 10$^4$ |

[a] m = 0.02 g, V = 20 mL, V/m = 1000 mL/g;
contact time: 24 h.

TABLE 19

Kinetics data of Pb$^{2+}$ using MoS4-Ppy under strong acid conditions.[a]

| C$_0$ (ppm) | time (min) | C$_f$ (ppm) | Removal (%) | K$_d$ (mL/g) | q$_t$ (mg/g) |
|---|---|---|---|---|---|
| 11.7 | 1 | 11.0 | 5.98 | 63.6 | 0.7 |
| | 5 | 11.0 | 5.98 | 63.6 | 0.7 |
| | 10 | 11.2 | 4.27 | 44.6 | 0.5 |
| | 30 | 11.2 | 4.27 | 44.6 | 0.5 |
| | 60 | 11.3 | 3.42 | 35.4 | 0.4 |
| | 180 | 11.2 | 4.27 | 44.6 | 0.5 |
| | 360 | 11.3 | 3.42 | 35.40 | 0.4 |

[a] m = 0.04 g, V = 40 mL, V/m = 1000 mL/g;
pH value: 0.83 → 1.18.

Selectivity for Ag$^+$ and Cu$^{2+}$ in weak and strong acid conditions. The remarkably high selectivity towards Ag$^+$ suggests MoS$_4$-Ppy could be an ideal material for the selective extraction of low-grade silver from some ores that are rich in copper. A batch of experiments focusing on the exploration of relative selectivity towards a mixture of Ag$^+$ and Cu$^{2+}$ were conducted under weak and strong acid conditions. The Ag$^+$ concentration was fixed at ~1 ppm while Cu$^{2+}$ concentrations were set at ~1, ~2, ~5, ~10, and ~20 ppm (Table 10, FIGS. 6A and 6B). In weak acid conditions (pH=3.3-5.7), the removals of Ag$^+$ and Cu$^{2+}$ both reached 96~99.9% at the molar ratios (n(Cu$^{2+}$)/n(Ag$^+$)) from 1.1 to 19.1 (FIG. 6A). When the n(Cu$^{2+}$)/n(Ag$^+$) ratio increased to 38.7 (C$_0^{Ag}$=0.74 ppm, C$_0^{Cu}$=20.04 ppm), the removal of Cu$^{2+}$ decreased to 79.1% while that of Ag$^+$ kept 99.8% (FIG. 6B). Generally, good separation factors (SF$_{A/B}$) are considered to be >100. The SF$_{Ag/Cu}$ (K$_d^{Ag}$/K$_d^{Cu}$) of 163.2 (=(6.2×10$^5$)/(3.8×10$^3$)) suggests excellent separation capability of Ag$^+$ from Cu$^{2+}$ by the MoS$_4$-Ppy (FIG. 6C). In the strong acid case (pH~1) (Table 8, FIG. 6B), the MoS$_4$-Ppy retained the excellent removal of Ag$^+$ (>99.8%), at n(Cu$^{2+}$)/n(Ag$^+$) ratios of 1.6-35.7 (C$_0^{Ag}$~1 ppm), while worse adsorption for Cu$^{2+}$ was observed with only 8.2-25.1% removal (FIG. 6B). In addition, the SF$_{Ag/Cu}$ increased sharply to 3.1×10$^3$~1.1×10$^5$ (FIG. 6D). The high SF$_{Ag/Cu}$ found in strong acid conditions indicate that MoS$_4$-Ppy could be an outstanding material for the extraction of silver from copper-rich low-grade minerals.

TABLE 10

Removal results using MoS$_4$-Ppy towards mixtures of Cu$^{2+}$ and Ag$^+$.[a]

|  | n(Cu$^{2+}$)/n(Ag$^+$) | C$_0$ (ppm) | C$_f$ (ppm) | Removal (%) | K$_d$ (mL/g) |
|---|---|---|---|---|---|
| weak acid case | 1.1 (pH: 5.69 → 3.95) | Cu$^{2+}$: 0.53 Ag$^+$: 0.82 | 0.019 0.033 | 96.4 96.0 | 2.7 × 10$^4$ 2.4 × 10$^4$ |
|  | 3.5 (pH: 5.52 → 3.82) | Cu$^{2+}$: 1.75 Ag$^+$: 0.84 | 0.006 0.0021 | 99.7 99.8 | 2.9 × 10$^5$ 4.0 × 10$^5$ |
|  | 8.6 (pH: 5.38 → 3.92) | Cu$^{2+}$: 4.38 Ag$^+$: 0.86 | 0.013 0.0018 | 99.7 99.8 | 3.4 × 10$^5$ 4.8 × 10$^5$ |
|  | 19.1 (pH: 5.29 → 3.52) | Cu$^{2+}$: 9.89 Ag$^+$: 0.88 | 0.205 0.0011 | 97.9 99.9 | 4.7 × 10$^4$ 8.0 × 10$^5$ |
|  | 38.7 (pH: 5.38 → 3.33) | Cu$^{2+}$: 20.0 Ag$^+$: 0.74 | 4.19 0.0012 | 79.1 99.8 | 3.8 × 10$^3$ 6.2 × 10$^5$ |
| strong acid case | 1.6 (pH: 0.78 → 0.75) | Cu$^{2+}$: 0.93 Ag$^+$: 1.00 | 0.74 0.0008 | 20.4 99.9 | 2.6 × 10$^2$ 1.2 × 10$^6$ |
|  | 3.2 (pH: 0.88 → 0.83) | Cu$^{2+}$: 1.91 Ag$^+$: 1.03 | 1.43 0.0005 | 25.1 99.99 | 3.4 × 10$^2$ 2.1 × 10$^6$ |
|  | 8.5 (pH: 0.86 → 0.84) | Cu$^{2+}$: 4.94 Ag$^+$: 0.99 | 4.25 0.002 | 14.0 99.8 | 1.6 × 10$^2$ 4.9 × 10$^5$ |
|  | 18.1 (pH: 0.74 → 0.75) | Cu$^{2+}$: 9.36 Ag$^+$: 0.97 | 8.51 0.001 | 9.1 99.9 | 99.9 9.7 × 10$^5$ |
|  | 35.7 (pH: 1.03 → 1.03) | Cu$^{2+}$: 19.74 Ag$^+$: 0.94 | 18.12 0.0002 | 8.2 99.9 | 89.4 9.7 × 10$^6$ |

[a] m = 0.02 g, V = 20 mL, V/m = 1000 mL/g; Contact time: 24 h.

Structural characterization of the post-adsorption solid samples. The solid samples after adsorption were centrifuged and air-dried for XRD, IR spectroscopy and XPS analyses. After Cu$^{2+}$ removal, the sample was X-ray amorphous (FIG. 7A trace b, FIG. 7A trace c) as the Ppy-MoS$_4$ precursor. For Ag$^+$, the XRD pattern of the 10-ppm adsorbed sample (FIG. 7A trace d) was also amorphous. However, with the increasing concentrations of Ag$^+$ (FIG. 7A trace e, FIG. 7A trace f), the solid samples presented weak diffraction peaks at 0.29, 0.26, 0.24 and 0.21 nm, suggesting the presence of Ag$_2$S (PDF #04-0774). Interestingly, for the Pb$^{2+}$ adsorbed samples (FIG. 7A trace g-FIG. 7A trace i), a set of new diffraction peaks were observed, which were attributed to the tetragonal phase of PbMoO$_4$ (PDF #44-1486). FIG. 7B and FIG. 7C show the XRD patterns at slow scan rates of the 200 ppm Pb$^{2+}$ and 1200 ppm Ag$^+$ post-adsorption samples and standard patterns of Ag$_2$S and PbMoO$_4$. For Hg$^{2+}$ (FIG. 7A trace j, FIG. 7A trace k), similar XRD patterns to those of Cu$^{2+}$ were observed.

Figure 11A:
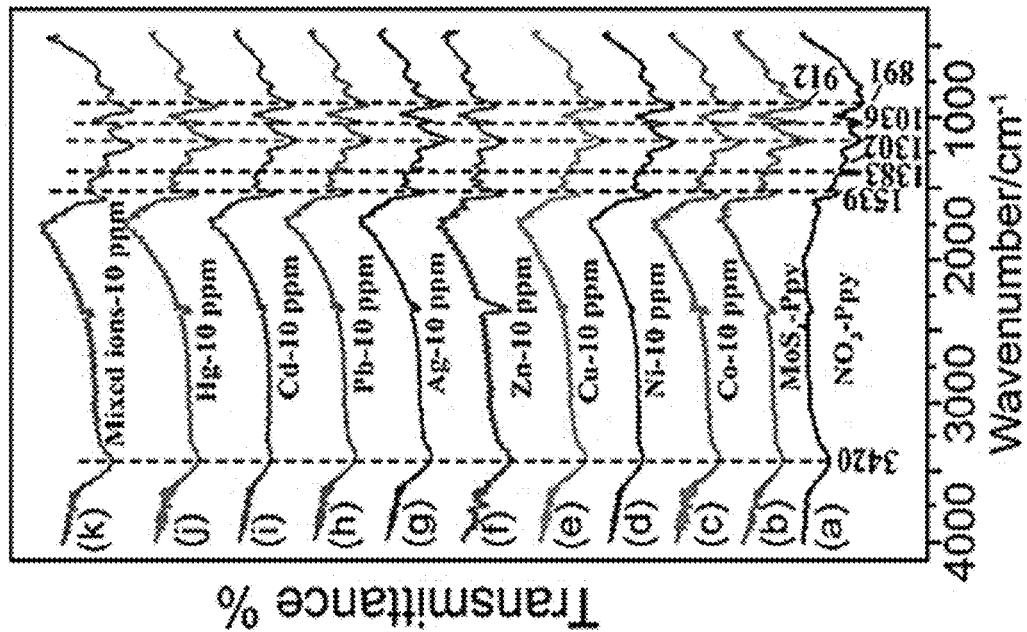
FIGS. 11A and 11B.
Figure 11B:
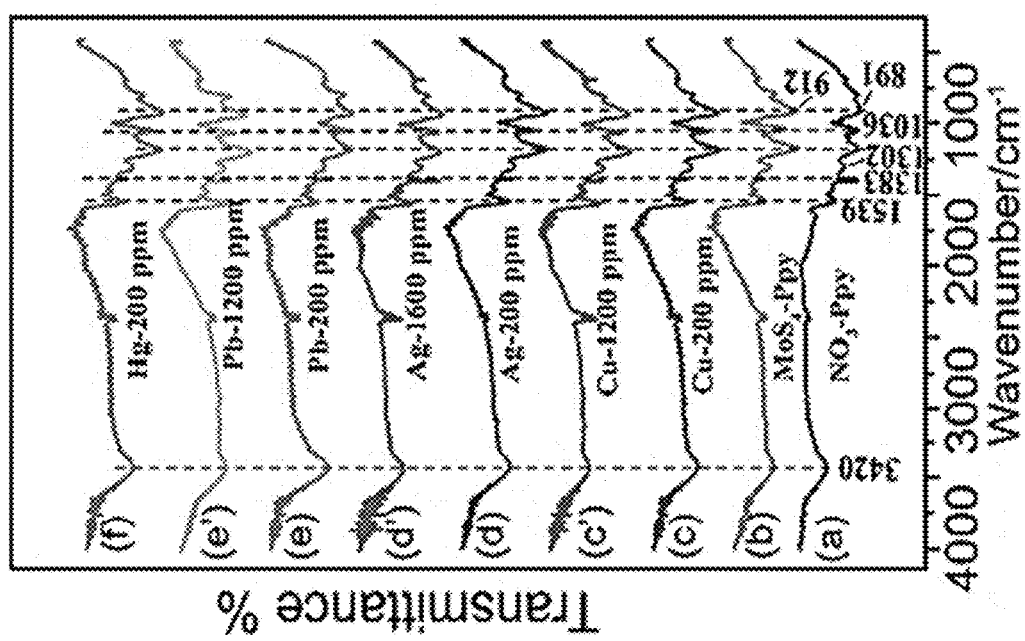

The mechanism of Hg$^{2+}$ removal was further investigated by IR (FIG. 11A, 11B) and XPS spectroscopy. XPS spectra of the post-adsorption samples are shown in FIG. 8A-8L. The Mo$^{VI}$ 3d energies observed at ~235 and ~233 eV, S 2s energy at ~227 eV, and S 2p peaks at ~163 eV were much closer to the corresponding values for MoS$_4$-Ppy precursor (FIG. 1C, FIG. 1D), indicating that the MoS$_4^{2-}$ groups were stable during the adsorption process. The presence of the weak peaks at ~168 eV (FIG. 8B, FIG. 8E, FIG. 8H, FIG. 8K) were from SO$_4^{2-}$ impurity as found above, considering some oxidation of S$^{2-}$ in air. For the Cu$^{2+}$ adsorbed sample, two characteristic peaks occurred at 952.8 (Cu 2p$_{1/2}$) and 933.0 eV (Cu 2p$_{3/2}$) ($\Delta$=19.9 eV) (FIG. 8C), arising from the Cu 2p energy of Cu$^{2+}$. As shown in FIG. 8F, the Ag 3d$_{3/2}$ and Ag 3d$_{5/2}$ energies at 374.5 and 368.5 eV respectively, were assigned to Ag$^+$. In FIG. 8I, the peaks at 143.9 (Pb 4f$_{5/2}$) and 139.0 eV (Pb 4f$_{7/2}$) correspond to Pb 4f levels of Pb$^{2+}$. For Hg$^{2+}$ (FIG. 8L), the Hg 4f levels were observed at 105.2 (Hg 4f$_{5/2}$) and 101.1 (Hg 4f$_{7/2}$) eV, indicating the presence of Hg$^{2+}$ in the post-adsorption sample.

Figure 12B:
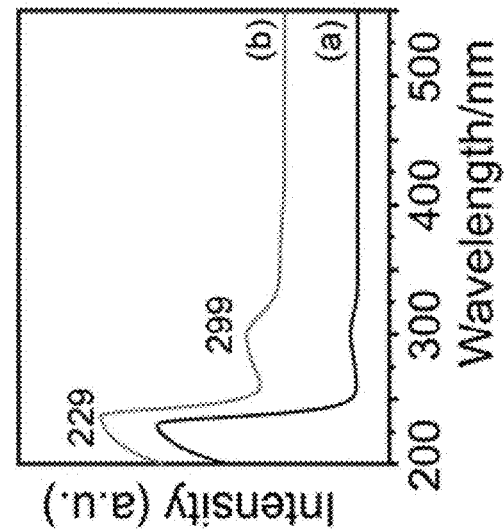
FIGS. 12A and 12B.
Figure 12A:
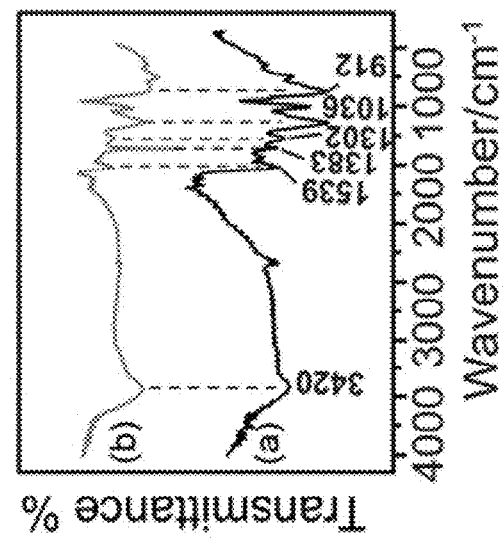

To probe the stability of MoS$_4$-Ppy in strong acid environment (abbr. MoS$_4$-Ppy-SA), the material was soaked in strong acid (H$_2$O/HNO$_3$ solution, pH~1) for 24 h. There was no obvious difference before and after soaking in the IR spectra (FIG. 12A). The increased intensity of 1383 cm$^{-1}$ band of NO$_3$ (FIG. 12A trace b), was due to the insertion of additional NO$_3^-$ in the structure and back ion-exchange. After acid soaking of MoS$_4$-Ppy, no UV-Vis absorptions attributed to MoS$_4^{2-}$ (241, 317, 468 nm) or MoO$_x$S$_{4-x}^{2-}$ (289, 393, 470 nm) were observed in the supernatant (FIG. 12B). In addition, XRD, IR, and XPS analyses of the Ag$^+$ post-adsorption samples were performed from the strong acid case (FIG. 13A-FIG. 13E). These experiments suggested that MoS$_4$-Ppy did not undergo dissolution, oxidation, or hydrolysis in the strong acid environment. Thus, MoS$_4$-Ppy is an acid durable and chemically stable material, and it is promising for the removal of heavy metal ions, especially from strongly-acidic polluted water.

MoS$_4$-Ppy is a novel material that exhibits highly selective and effective removal of heavy metal ions such as Cu$^{2+}$, Ag$^+$, and Hg$^{2+}$, relying mainly on the coordination interactions of S$^{2-}$ sites and these metal ions. The key findings were: (a) in the weak acid case, highly efficient removal of Ag$^+$, Pb$^{2+}$, Hg$^{2+}$ was rapidly achieved with >99% for Ag$^+$ (pH=4.6), >99.7% for Pb$^{2+}$ (pH=4.7), and >98% for Hg$^{2+}$ (pH=2.1); (b) in strongly acidic conditions (pH≈1), MoS$_4$-Ppy had an enhanced removal efficiency for Ag$^+$ and Hg$^{2+}$ (>99.9%) and can achieve a final Hg$^{2+}$ concentration of ≤2 ppb, which is the limit value of Hg$^{2+}$ in drinking water; (c) enormous record-high uptake capacities (q$_m$) of 480 mg/g (pH≈5) and 725 mg/g (pH≈1) for Ag$^+$ were obtained; (d) wide pH range was available for efficient Ag$^+$ and Pb$^{2+}$ removal: nearly complete Ag$^+$ removal (>99.99%) at a pH=0.6-5.0, and >98% removal for Pb$^{2+}$ at pH=2.5-6.0; (e) successful separation of Ag$^+$ from high concentrations of Cu$^{2+}$. Under strong acidic conditions (pH~1), very large SF$_{Ag/Cu}$ values (3.1×10$^3$~1.1×10$^5$) were achieved, which demonstrate the usefulness of MoS$_4$-Ppy for extraction of silver from copper-rich minerals. Therefore, because of its excellent chemical stability and the outstanding removal abilities for heavy metal ions, MoS$_4$-Ppy is well-suited for the remediation of heavy metal polluted acidic water as well as for separating silver from raw Cu/Ag mixtures in strongly acidic media.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of removing metal ions from a sample comprising at least two different transition metal ions, using a thioanion-functionalized polypyrrole comprising:
a conjugated, positively charged backbone of pyrrole units; and
charge-balancing thioanions associated with the conjugated, positively charged backbone of pyrrole units,
the method comprising:
exposing the thioanion-functionalized polypyrrole to the sample comprising the at least two different transition metal ions, wherein at least one of the at least two different transition metal ions is adsorbed by the thioanion-functionalized polypyrrole; and
removing the thioanion-functionalized polypyrrole and the absorbed transition metal ions from the sample.

2. The method of claim 1, wherein the thioanions comprise at least one of molybdenum thioanions, tungsten thioanions, antimony thioanions, tin thioanions, phosphorus thioanions, $S_x^{2-}$ anions, wherein x=1, 2, 3, 4, 5, or 6, or $SH^{1-}$ anions.

3. The method of claim 2, wherein the thioanions comprise the molybdenum thioanions.

4. The method of claim 3, wherein the molybdenum thioanions comprise $MoS_4^{2-}$ anions.

5. The method of claim 2, wherein the thioanions comprise the antimony thioanions.

6. The method of claim 2, wherein the thioanions comprise the tin thioanions.

7. The method of claim 2, wherein the thioanions comprise the phosphorus thioanions.

8. The method of claim 2, wherein the thioanions comprise the $S_x^{2-}$ anions.

9. The method of claim 2, wherein the thioanions comprise the $SH^{1-}$ anions.

10. A method of removing metal ions from a sample, wherein the sample is an aqueous solution comprising the metal ions and having a pH of no greater than 6, using a thioanion-functionalized polypyrrole comprising:
a conjugated, positively charged backbone of pyrrole units; and
charge-balancing thioanions associated with the conjugated, positively charged backbone of pyrrole units,
the method comprising:
exposing the thioanion-functionalized polypyrrole to the sample, wherein the metal ions are adsorbed by the thioanion-functionalized polypyrrole; and
removing the thioanion-functionalized polypyrrole and the absorbed metal ions from the sample.

11. The method of claim 10, wherein the aqueous solution has a pH of no greater than 5.

12. The method of claim 10, wherein the aqueous solution has a pH in the range from 0.5 to 1.5.

13. The method of claim 1, wherein the at least two different transition metal ions include $Ag^+$ ions, $Hg^{2+}$ ions, $Pb^{2+}$ ions, $Cu^{2+}$ ions, $Cr^{6+}$ ions, $Tl^+$ ions, $Cd^{2+}$ ions, or a combination of two or more thereof.

14. The method of claim 1, wherein the at least two different transition metal ions include $Ag^+$ ions.

15. The method of claim 4, wherein the sample is an aqueous solution having a pH in the range from 0.5 to 1.5 and the sample comprises $Ag^+$ ions and $Cu^{2+}$ ions.

16. The method of claim 1, wherein the sample is an aqueous solution having a pH of no greater than 6.

17. The method of claim 1, wherein the thioanion-functionalized polypyrrole is provided in a particulate form and packed into a column, and exposing the thioanion-functionalized polypyrrole to the sample comprises passing the sample through the column.

18. The method of claim 1, wherein the sample comprises waste water generated from an industrial plant or waste water generated from a mining process.

19. The method of claim 10, wherein the sample comprises waste water generated from an industrial plant or waste water generated from a mining process.

20. The method of claim 10, wherein the metal ions include $Ag^+$ ions, $Hg^{2+}$ ions, $Pb^{2+}$ ions, $Cu^{2+}$ ions, $Cr^{6+}$ ions, $Tl^+$ ions, $Cd^{2+}$ ions, or a combination of two or more thereof.

* * * * *